United States Patent [19]
Kawase et al.

[11] Patent Number: 5,753,362
[45] Date of Patent: May 19, 1998

[54] ACRYLIC SHEET, ACRYLIC ADHESIVE SHEET AND PROCESSES FOR PREPARING THE SHEETS

[75] Inventors: Susumu Kawase; Tatsuhiro Imai, both of Sayama, Japan

[73] Assignee: Soken Chemical & Engineering Co., Ltd., Tokyo, Japan

[21] Appl. No.: 514,114

[22] Filed: Aug. 11, 1995

[30] Foreign Application Priority Data

| Aug. 12, 1994 | [JP] | Japan | 6-190593 |
| Aug. 12, 1994 | [JP] | Japan | 6-190594 |
| Dec. 2, 1994 | [JP] | Japan | 6-300035 |

[51] Int. Cl.$^6$ .................................................. B32B 5/16
[52] U.S. Cl. ............................................ 428/327; 428/523
[58] Field of Search ..................................... 428/327, 523, 428/340, 143, 147

[56] References Cited

U.S. PATENT DOCUMENTS

| H509 | 8/1988 | Chao | 526/264 |
| Re. 24,906 | 12/1960 | Ulrich | 206/59 |
| 4,180,619 | 12/1979 | Makhlouf et al. | 526/202 |
| 4,181,752 | 1/1980 | Martens et al. | 427/54.1 |
| 4,223,067 | 9/1980 | Levens | 428/308 |
| 4,556,595 | 12/1985 | Ochi | 428/143 |
| 4,666,771 | 5/1987 | Vesley et al. | 428/325 |
| 4,748,061 | 5/1988 | Vesley | 428/40 |
| 4,855,170 | 8/1989 | Darvell et al. | 428/40 |

OTHER PUBLICATIONS

Official Gazette, Jan. 1, 1980, p. 289, referencing U.S. Patent No. 4,181,752.
Patent Abstracts of Japan, Pub. No. 55–139433, published Oct. 31, 1980, 1 page.
Patent Abstracts of Japan, Pub. No. 58–049766, published Mar. 24, 1983, 1 page.
Patent Abstracts of Japan, Pub. No. 59–064682, published Apr. 12, 1984, 1 page.
Patent Abstracts of Japan, Pub. No. 60–166366, published Aug. 29, 1985, 1 page.
Patent Abstracts of Japan, Pub. No. 63–089585, published Apr. 20, 1988, 1 page.
Patent Abstracts of Japan, Pub. No. 01–201320, published Aug. 14, 1989, 1 page.
Patent Abstracts of Japan, Pub. No. 01–304170, published Dec. 7, 1989, 1 page.
Patent Abstracts of Japan, Pub. No. 04–045184, published Feb. 14, 1992, 1 page.
Patent Abstracts of Japan, Pub. No. 05–179208, published Jul. 20, 1993, 1 page.
Patent Abstracts of Japan, Pub. No. 05–186744, published Jul. 27, 1993, 1 page.
Patent Abstracts of Japn, Pub. No. 06–049415, published Feb. 22, 1994, 1 page.
Patent Abstracts of Japan, Pub. No. 06–346038, published Dec. 20, 1994, 1 page.
Patent Abstract of Japan, Pub. No. 07–090028, published Apr. 4, 1995, 1 page.
Patent Abstract of Japan, Pub. No. 4–24887, published Jan. 28, 1992, 1 page.

*Primary Examiner*—H. Thi Le
*Attorney, Agent, or Firm*—Webb Ziesenheim Bruening Logsdon Orkin & Hanson, P.C.

[57] ABSTRACT

The acrylic sheet of the invention is an acrylic sheet containing particles homogeneously dispersed in a resin matrix which does not substantially contain air bubbles and has an air bubble content of not more than 10% by volume; in which the resin matrix for constituting the acrylic sheet is a crosslinked (meth)acrylic copolymer obtained by forming a crosslinked structure among the molecules of a (meth) acrylic copolymer, which is a copolymer of 0.1–15% by weight of a polymerizable monomer having a functional group, 60–99.9% by weight of a (meth)acrylic acid alkyl ester and 0–39.9% by weight of other monomer and has a weight-average molecular weight of 150,000 to 1,200,000, by means of a polyfunctional compound having reactivity to the functional group of the polymerizable monomer for preparing the (meth)acrylic copolymer; and the particles dispersed in the resin matrix formed from the crosslinked (meth)acrylic copolymer have a mean particle diameter of 1 to 100 μm and a true specific gravity of 0.2 to 3.0. This acrylic sheet can be prepared by synthesizing a specific (meth)acrylic copolymer in an aqueous medium or an organic solvent, mixing a reaction solution of the copolymer with the polyfunctional compound and particles, casting the deformed mixture and drying it. The acrylic adhesive sheet of the invention is an adhesive sheet having an adhesive layer provided on at least one surface of the acrylic sheet, and can be prepared by forming the adhesive layer on the surface of the acrylic sheet.

10 Claims, 2 Drawing Sheets

ACRYLIC SHEET, ACRYLIC ADHESIVE SHEET AND PROCESSES FOR PREPARING THE SHEETS

FIELD OF THE INVENTION

The present invention relates to acrylic sheets used for bonding and fixing members of various industrial fields, such as fields of automobiles, vehicles, ships, aircrafts, buildings, building materials, electrical appliances, office automation machines, displays (e.g., advertising displays) and mechanical parts, or used for bonding and fixing commercially available ordinary members, and also relates to acrylic adhesive sheets obtained by imparting adhesion properties to the acrylic sheets and to processes for preparing these acrylic sheets and acrylic adhesive sheets.

BACKGROUND OF THE INVENTION

In various fields, for example, of automobiles, mechanical parts, electrical appliances and building materials, adhesive bonding has been widely used in place of conventional mechanical jointing. Adhesives are generally used for bonding adherends of different properties together, so that they need to have not only high adhesion strength but also high shear strength and good shape-following properties.

As a pressure-sensitive adhesive sheet used for such bonding, Japanese Patent Publication No. 17030/1982 discloses a pressure-sensitive adhesive sheet wherein 20–60% by volume of micro-bubbles having a mean diameter of 10 to 200 μm and a specific gravity of less than 1 are dispersed in an adhesive layer which does not substantially contain void and which has a thickness of not less than 3 times the mean diameter of the micro-bubbles and not less than 2 times the maximum diameter of the micro-bubbles, i.e., not less than 2 mm.

The pressure-sensitive adhesive layer of this adhesive sheet shows good resistance to both the peel force and the shear force, and for example, it exhibits sufficient elasticity under stress for a short period of time, but when the stress is kept for a while, the elasticity becomes extremely low. Further, when this sheet is pressed onto a rough adherend surface, the adhesive of the sheet comes into the rough surface to provide good adhesion between the finely protruded and depressed adherend surface and the adhesive sheet, even after the pressure is released.

For the economical reason, the pressure-sensitive adhesive sheet is generally prepared by a process wherein glass micro-bubbles are dispersed in a polymerizable mixture, the resulting dispersion is applied to a support and the coated support is irradiated with ultraviolet light to polymerize the mixture. In this case, the glass micro-bubbles are required to have ultraviolet transmission properties; the smaller the thickness of glass microbubbles, the higher the ultraviolet transmission properties. That is, for this pressure-sensitive adhesive sheet, glass micro-bubbles having ultraviolet transmission properties are required to be used. In the above publication, it is also disclosed that the polymerization can be carried out by applying heat other than irradiation with ultraviolet light to prepare the pressure-sensitive adhesive sheet. However, thermal polymerization of an adhesive composition described in the publication is appreciably low in the polymerization rate as compared with the polymerization using ultraviolet light, bringing about considerably high costs for bonding.

U.S. Pat. No. 4,181,752 discloses a pressure-sensitive acrylic adhesive tape obtained by UV irradiation, and it is described that the UV irradiation should be carried out at not more than 7 mW/cm$^2$ in a wavelength region of 3,000 to 4,000 angstroms in order to prepare a tape having a holding power of not shorter than 50 minutes and a peel strength of not less than 0.8 kg/cm.

The molecular weight of a polymer governs the final properties of the sheet, and the polymerization rate determines the molecular weight. That is, as the polymerization rate is raised, the molecular weight lowers, so that the resulting polymeric compound cannot be used for an adhesive tape owing to its small cohesion. For increasing the molecular weight of the polymeric compound, the intensity of UV irradiation is required to be set at a low level (e.g., not more than 7 mW/cm$^2$). When the polymerization is carried out under such UV irradiation conditions, a linear and high-molecular polymeric compound can be formed, and by the addition of a crosslinking agent to such reaction system, it is also possible to give the polymeric compound a slightly crosslinked structure.

In this technique, however, there are problems that the UV irradiation time to complete the polymerization is prolonged because of the low polymerization rate, so that for a line production of the adhesive tape, a long line equipped with a large number of UV lamps must be employed.

Japanese Patent Laid-Open Publication No. 272251/1986 discloses a product incorporated with glass micro-bubbles made of colored glass; Japanese Patent Laid-Open Publication No. 241087/1988 discloses a pressure-sensitive composite adhesive sheet and a process for preparing the same; and Japanese Patent Laid-Open Publication No. 237176/1991 discloses a process for preparing a pressure-sensitive adhesive sheet containing glass micro-bubbles, by ultraviolet polymerization of a mixture containing colored glass micro-bubbles and a photopolymerizable monomer in which a pigment or dye is dispersed.

The inventions described above relate to pressure-sensitive adhesive sheets prepared by ultraviolet polymerization or thermal polymerization of an adhesive dispersion containing glass micro-bubbles having a low thickness and a low specific gravity (specific gravity not more than 0.2). Owing to the glass micro-bubbles, these sheets show high peel resistance and high resistance to shear force. Moreover, these sheets obtained by ultraviolet polymerization are economically advantageous.

In the pressure-sensitive adhesive sheets, however, the dispersed glass micro-bubbles must have ultraviolet transmission properties because they are basically prepared by ultraviolet polymerization. The pressure-sensitive adhesive sheets have been recently required to have not only a function of bonding but also other functional properties such as conductivity, flame retardance and colorability. However, the above-mentioned constitution that the glass micro-bubbles need to have ultraviolet transmission properties often becomes an obstacle to impartation of the additional properties to the pressure-sensitive adhesive sheets. Further, there are various demands on the pressure-sensitive adhesive sheets, but the adhesive sheets having a united structure of adhesive and sheet are limited in the selection of adherends, so that such adhesive sheets hardly satisfy the various demands.

Especially in the market of adhesives for fixing members, demands on the adhesive sheets for adhesion strength and adhesion reliability have recently become more severe. For example, double-coated adhesive tapes having adhesive layers formed on both surfaces of a core material such as a nonwoven fabric are poor in the dispersion of a stress applied to the tape. When the stress is given to the tape, the stress is concentrated to both ends of the tape without being dispersed, whereby the tape easily peels off and sufficient adhesion strength is not obtained.

Japanese Patent Laid-Open Publication No. 49415/1994 discloses a UV polymerized adhesive comprising an acrylic acid ester monomer derived from an alkyl alcohol of 4 to 14 carbon atoms and a monofunctional oligoester acrylate, and this UV polymerized adhesive may be blended with a glass powder and/or a polyethylene powder. Japanese Patent Laid-Open Publication No. 179208/1993 discloses an adhesive tape having an adhesive layer obtained by irradiating a composition composed of an acrylic acid ester monomer derived from an alkyl alcohol of 4 to 14 carbon atoms, 100 parts by weight of a monomer copolymerizable with said ester monomer, 0.0001 to 0.02 part by mol of polyfunctional oligoacrylate having a molecular weight of not less than 300 and a photopolymerization initiator, with UV light of 120 W/cm$^2$ at 365 nm.

In the above publications, the tapes are prepared by increasing the UV intensity to raise the polymerization rate and performing the UV irradiation three times. However, if the UV intensity is increased as above, a high polymerization rate can be attained for a short time, but a low-molecular weight polymer is formed. For this reason, a polyfunctional monomer is added in a small amount to form a crosslinked structure among the molecules so as to obtain a high molecular weight. However, since the polymer obtained using such technique has a low degree of polymerization among the crosslinked points, this polymer is inferior in the stress dispersion to the polymer having a high degree of polymerization among the crosslinked points. In particular, the polymer having a low molecular weight among the crosslinked points does not show sufficient adhesion properties such as constant load peel resistance when a weak force is given for a long period of time.

In the UV polymerization, moreover, the UV light absorbency (incident light energy/absorbed light energy=$I_d/I_o$) is greatly different between the upper portion and the lower portion of the adhesive composition, and in many cases there arises a problem that the properties are different between the upper portion and the lower portion of the adhesive composition.

Other than the pressure-sensitive adhesive sheets using glass micro-bubbles, there are known pressure-sensitive adhesive sheets obtained by incorporating air bubbles into a polymer matrix to form an acrylic foam and providing a pressure-sensitive adhesive layer on the surface of the acrylic foam. For example, Japanese Patent Publication No. 58369/1983 discloses a process for preparing an acrylic foam by adding an urea type foaming agent to an aqueous dispersion of a polymer or a monomer mainly comprising MMA, and conducting thermal foaming. Japanese Patent Laid-Open Publication No. 89585/1988 discloses an adhesive sheet obtained by the steps of bubbling an acrylic emulsion with stirring, preparing a foam sheet using the emulsion and providing an adhesive layer on the surface of the sheet. As an improvement of the air bubble-containing adhesive sheet, Japanese Patent Laid-Open Publication No. 186744/1993 discloses an adhesive sheet prepared using a mixture of an acrylic emulsion and an urethane emulsion. Further, Japanese Patent Laid-Open Publication No. 45184/1992 discloses an adhesive foam sheet containing both of continuous open cells produced by mechanically stirring an acrylic emulsion and closed cells produced by the reaction with the foaming agent in the thermal drying procedure. Japanese Patent Laid-Open Publication No. 304170/1989 discloses an adhesive sheet obtained by foaming an emulsion mixture of an acrylic polymer based on acrylic acid alkyl ester, an epoxy resin and an acrylic resin, then casting the foamed emulsion, heat treating the cast layer to form a crosslinked structure so as to prepare a sheet, and finally providing an adhesive layer on the surface of the sheet.

Japanese Patent Laid-Open Publication No. 201320/1989 discloses a void-forming agent composition which comprises a low-molecular weight acrylic copolymer and a polyfunctional isocyanate and which is cured by the polyfunctional isocyanate with forming voids. In this invention, hollow particles or a foaming agent is used as the void-forming agent, and as the hollow particles, those of 0.01 to 0.5 g/cm$^3$ are used to ensure flexibility of the resulting sheet.

There is also known a double-coated foam tape obtained by coating both surfaces of a support made of a rubber or plastic open-cell thin-skinned foam with an adhesive and crosslinking within the network cells of the support, as described in Japanese Patent Laid-Open Publication No. 24887/1992. In the adhesive layers of this double-coated adhesive tape, a conductive fine powder is incorporated. In this case, the open-cell thin-skinned foam sliced from an open cell foam is united with an adhesive into one body thereby to thicken the adhesive layer and enhance the mechanical strength and adhesion force of the tape, while the conventional adhesive tape having a foamed support has such a separate structure or an interface structure that the adhesive layers provided on both surfaces are separated by the foamed support.

The double-coated tape of this structure is improved in the adhesion force, but there resides a problem that long-term reliability required for an adhesive such as constant load peel resistance or holding power is not satisfactorily exhibited because the stress is not sufficiently dispersed in the sheet.

In a pressure-sensitive adhesive sheet using an air bubble-containing sheet as mentioned above, the air bubble-containing sheet is deformed in accordance with fine protrusions and depressions on the adherend surface to increase the adhesion area, whereby the adhesion strength of the adhesive sheet can be improved. However, due to the incorporation of air bubbles, the mechanical strength (tensile strength, interlaminar strength) tends to lower. In the case where a resin having slight water absorption properties, such as an acrylic copolymer, is used as a polymer matrix, water may penetrate into the air bubbles formed in the polymer matrix, whereby the water resistance of the pressure-sensitive adhesive sheet is lowered.

There is also a problem that the pressure-sensitive adhesive sheet is compressed to force the adhesive out when the sheet is wound up.

In order to solve problems associated with the case of using foamed resins, various means have been heretofore devised. For example, the cells (air bubbles) formed in the matrix are made open cells using a foaming agent; a resin having a high glass transition temperature (e.g., PMMA) is used as a polymer matrix; plural resins are used in combination; or a foaming agent or a crosslinking agent is used to form a crosslinked structure to impart elasticity to the air bubble-containing sheet.

When the foam thus produced is used as a support, the resulting pressure-sensitive adhesive sheet shows excellent 180° peel strength and creep resistance (holding power), but the constant load peel strength of the sheet tends to lower. For example, in the 90° peel test, the adhesive sheet gradually peels from the adherend surface (interfacial peel phenomenon), whereby the adherend does not endure long-time bonding and falls off in a relatively short period of time. This interfacial peel phenomenon tends to markedly take place as the crosslink density of the sheet becomes higher, and thus the elasticity thereof becomes greater.

In the preparation of an emulsion polymer, various additives such as an emulsifier, a crosslinking agent, a curing agent, a thickening agent, a pH adjustor and a gelatinizing agent are added to the emulsion. However, these additive components, which remain in the sheet obtained by drying the emulsion, may cause reduced resistance to water and organic solvents. Particularly, the emulsifier remaining in the sheet bleeds out on the sheet surface when the sheet is exposed to environmental change of high and low temperature cycles, resulting in a serious problem that the adhesion properties of the pressure-sensitive adhesive layer is deteriorated. Many of the crosslinking agents used for improving water resistance or resistance to organic solvents have temperature-dependent crosslinking reaction rates. However, the heating conditions in the preparation process, such as a heating temperature and a rate in the drying line, are naturally limited from the economical viewpoint, so that it is difficult to complete foaming or crosslinking reaction by heating in the preparation process. Therefore, there arises a problem of thermal aging that the crosslinking agent remaining in the sheet slowly undergoes reaction over time to gradually alter the properties of the sheet. Moreover, when a crosslinked structure is formed, the glass transition temperature of the polymer is generally raised, and the elasticity at low temperatures is increased. Hence, in the case where such a pressure-sensitive adhesive sheet is processed in environment of low temperatures, such as winter season, the sheet can be hardly handled because the sheet is too rigid.

In addition to these pressure-sensitive adhesive sheets described above, Japanese Patent Laid-Open Publication No. 49766/1983 discloses an invention of an adhesive material obtained by filling an adhesive base with any one of fibers, particles, hollow particles and a scaly substance of high elastic modulus. As the adhesive base, solvent-soluble resins such as chloroprene resins, two-pack reaction-curing type resins such as epoxy resins, ultraviolet curing resins and electron rays curing resins are used. In the adhesive material, the elastic modulus is increased by adding the filler, and as a result the critical frequency in the high frequency region of a speaker is further shifted to the higher frequency side so as to enlarge the reproduction area. Japanese Patent Laid-Open Publication No. 64682/1984 discloses an invention of an adhesive composition obtained by adding hollow glass particles having a mean particle diameter of 5 to 100 μm to a polymeric latex. This adhesive composition is used for fiber products such as carpets and pile fabrics, and for the purposes of imparting heat insulating properties to the fiber products, weight saving and supplementing rigidity of the fiber products. This publication describes that as the polymeric latexes, a rubber latex, an ethylene-vinyl acetate copolymer latex, a vinyl chloride-vinyl acetate copolymer latex, a vinyl chloride polymer latex, a polyvinyl acetate emulsion, etc. are employable.

Japanese patent laid-open publication no. 90028/1995, that was applied for patent in Japan prior to the date of three patent applications on the basis of which the priority of the present application is claimed and was laid open after the date of those three patent applications, discloses an invention of an adhesive tape prepared by adding a photopolymerization initiator, a specific filler and a crosslinking component to a specific acrylic monomer to prepare a photopolymerizable composition and irradiating the photopolymerizable composition with ultraviolet light to perform copolymerization reaction and crosslinking reaction.

In the composition, however, a mixture of the monomer, the crosslinking agent and the filler having low light transmission properties is irradiated with light, so that a sheet having a resin matrix of non-uniform structure is obtained. Therefore, the stress given to the sheet is hardly relaxed by the resin matrix, and in spite that the filler is incorporated, an action of relaxing the stress given to the sheet is hardly exerted.

Thus, the irradiation condition disclosed in this publication is 2 mW/cm$^2$, and in the case of such low UV intensity, the filler incorporated hinders transmission of the UV light on the opposite side of the filler in the adhesive composition (the transmittance is reduced by several tens percent as compared with a light transmission type adhesive), whereby an area of high polymerization rate and an area of low polymerization rate are produced in the tape. As a result, an non-uniform tape in which a crosslinked structure of low molecular weight and a crosslinked structure of high molecular weight are contained is apt to be formed. Moreover, the absorbency of the UV light differs among the upper part, the center part and the lower part of the adhesive layer in conformity with the Lambert-Beer's law to make a difference in the polymerization rate, and thereby a uniform polymer structure cannot be obtained. Accordingly, a crosslinked structure is formed in the adhesive, and the shear force resistance and the holding power are improved, but the constant load peel resistance is not sufficiently improved.

The above publication also shows a comparative example in which an organic solvent solution of 12,000 cps containing the acrylic copolymer is prepared and this solution is mixed with glass fibers. In this comparative example, it is described that an adhesive tape could not be obtained because the glass fibers were agglomerated and sedimented.

When a filler is dispersed in a resin solution or the like, the dispersibility of the filler varies depending on, for example, shape, specific gravity and particle diameter of the filler, type and molecular weight of the resin, viscosity of the resin solution. In the above publication, there is no description on the dispersing conditions of the filler, and accordingly this publication only shows a failure example that the filler could not be homogeneously dispersed when the filer was added to the resin solution.

OBJECT OF THE INVENTION

It is an object of the present invention to provide an acrylic sheet which has high durability, high reliability and economical advantages and can be imparted with desired functions such as conductivity, flame retardance and colorability when used as a core material of an adhesive sheet for fixing members, and a process for preparing said sheet from an acrylic emulsion or an organic solvent solution of an acrylic polymer.

It is another object of the invention to provide a pressure-sensitive adhesive sheet which has high durability, high reliability and economical advantages and can be imparted with desired functions such as conductivity, flame retardance and colorability, and a process for preparing said adhesive sheet from an acrylic emulsion or an organic solvent solution of an acrylic polymer.

SUMMARY OF THE INVENTION

The acrylic sheet of the present invention is an acrylic sheet containing particles homogeneously dispersed in a resin matrix which does not substantially contain air bubbles and has an air bubble content of not more than 10% by volume, in which:

the resin matrix for constituting the acrylic sheet is a crosslinked (meth)acrylic copolymer obtained by forming a crosslinked structure among the molecules of a (meth)acrylic copolymer, which is a copolymer of 0.1–15% by weight of a polymerizable monomer having a functional group, 60–99.9% by weight of a (meth)acrylic acid alkyl ester and 0–39.9% by weight of other monomer and has a weight-average molecular weight of 150,000 to 1,200,000, by means of a polyfunctional compound having reactivity to the functional group of the polymerizable monomer for preparing the (meth)acrylic copolymer; and the particles dispersed in the resin matrix formed from the crosslinked (meth)acrylic copolymer have a mean particle diameter of 1 to 100 µm and a true specific gravity of 0.2 to 3.0.

This acrylic sheet can be prepared by the process of the invention, comprising the steps of:

copolymerizing 0.1–15% by weight of a polymerizable monomer having a functional group, 60–99.9% by weight of a (meth)acrylic acid alkyl ester and 0–39.9% by weight of other monomer in an aqueous medium and/or an organic solvent, to prepare a (meth)acrylic copolymer having a weight average molecular weight of 150,000 to 1,200,000;

mixing a reaction solution containing the (meth)acrylic copolymer, a polyfunctional compound having reactivity to the functional group of the polymerizable monomer for preparing the (meth)acrylic copolymer or a solution of the polyfunctional compound and 15–55% by volume, based on the amount of the (meth)acrylic copolymer, of particles having a mean particle diameter of 1 to 100 µm and a true specific gravity of 0.2 to 3.0, to homogeneously disperse the particles in the mixed solution containing the (meth)acrylic copolymer and the polyfunctional compound;

defoaming the resulting mixture so that the air bubble content becomes not more than 10% by volume based on the amount of the resin in the mixture;

casting the defoamed mixture;

removing the volatile components; while allowing at least a part of the polyfunctional compound to react with at least a part of the group of the polymerizable monomer for preparing the (meth)acrylic copolymer, to form a crosslinked structure among the molecules.

The acrylic sheet of the invention may be in the form a laminate. In this case, the acrylic sheet in the form of a laminate can be prepared by a process wherein, on a surface of an acrylic sheet obtained by casting the defoamed mixture on a separator in a dry thickness of not more than 0.5 mm and removing the volatile components, or on a surface of an aged acrylic sheet obtained by aging the above acrylic sheet to accelerate or complete the reaction of the polyfunctional compound with the functional group of the polymerizable monomer, the defoamed mixture is further cast in a dry thickness of not more than 0.5 mm, and then the volatile components are removed.

Alternatively, the acrylic sheet in the form of a laminate can be prepared by a process wherein at least two acrylic sheets obtained by casting the defoamed mixture on a separator in a dry thickness of not more than 0.5 mm and removing the volatile components, or at least two aged acrylic sheets having autohesion obtained by aging the above acrylic sheets to accelerate the reaction of the polyfunctional compound with the functional group of the polymerizable monomer are placed one upon another and laminated together under pressure owing to the autohesion of the sheets.

The acrylic adhesive sheet of the invention is an acrylic adhesive sheet comprising an acrylic sheet and an adhesive layer provided on at least one surface of the acrylic sheet, said acrylic sheet containing particles homogeneously dispersed in a resin matrix which does not substantially contain air bubbles and has an air bubble content of not more than 10% by volume, in which:

the resin matrix for constituting the acrylic sheet is a crosslinked (meth)acrylic copolymer obtained by forming a crosslinked structure among the molecules of a (meth)acrylic copolymer, which is a copolymer of 0.1–15% by weight of a polymerizable monomer having a functional group, 60–99.9% by weight of a (meth)acrylic acid alkyl ester and 0–39.9% by weight of other monomer and has a weight-average molecular weight of 150,000 to 1,200,000, by means of a polyfunctional compound having reactivity to the functional group of the polymerizable monomer for preparing the (meth)acrylic copolymer; and the particles dispersed in the resin matrix formed from the crosslinked (meth)acrylic copolymer have a mean particle diameter of 1 to 100 µm and a true specific gravity of 0.2 to 3.0.

This acrylic adhesive sheet can be prepared by the process of the invention comprising the steps of:

copolymerizing 0.1–15% by weight of a polymerizable monomer having a functional group, 60–99.9% by weight of a (meth)acrylic acid alkyl ester and 0–39.9% by weight of other monomer in an aqueous medium and/or an organic solvent, to prepare a (meth)acrylic copolymer having a weight average molecular weight of 150,000 to 1,200,000;

mixing a reaction solution containing the (meth)acrylic copolymer, a polyfunctional compound having reactivity to the functional group of the polymerizable monomer for preparing the (meth)acrylic copolymer or a solution of the polyfunctional compound and 15–55% by volume, based on the amount of the (meth)acrylic copolymer, of particles having a mean particle diameter of 1 to 100 µm and a true specific gravity of 0.2 to 3.0, to homogeneously disperse the particles in the mixed solution containing the (meth)acrylic copolymer and the polyfunctional compound;

defoaming the resulting mixture so that the air bubble content becomes not more than 10% by volume based on the amount of the resin in the mixture;

casting the defoamed mixture;

removing the volatile components, while allowing at least a part of the polyfunctional compound to react with at least a part of the group of the polymerizable monomer for preparing the (meth)acrylic copolymer to form a crosslinked structure among the molecules, so as to form an acrylic sheet; and forming an adhesive layer on at least one surface of the acrylic sheet.

The acrylic sheet of the invention is a sheet wherein specific particles are homogeneously dispersed in a resin matrix formed from a (meth)acrylic copolymer substantially not containing air bubbles. The reason why the particles are homogeneously dispersed in the resin matrix is that the (meth)acrylic copolymer having a weight-average molecular weight of 150,000 to 1,200,000 is preliminarily prepared in an aqueous medium or an organic solvent and a crosslinked structure is formed among the molecules of the (meth) acrylic copolymer in such condition that the particles are dispersed in the (meth)acrylic copolymer. That is, in a reaction solution containing the (meth)acrylic copolymer having a weight-average molecular weight of 150,000 to 1,200,000, not only the specific particles can be favorably dispersed but also a stably dispersed state of the particles can be kept for a relatively long period of time, because of the high weight-average molecular weight of the (meth)acrylic copolymer. Therefore, by casting the reaction solution in which the particles are dispersed and removing water or the organic solvent while forming a intermolecular crosslinked structure, sedimentation or floating of the particles hardly takes place, and hence a sheet can be formed maintaining the favorably dispersed state of the particles.

In the invention, a high-molecular weight (meth)acrylic copolymer is formed in such a manner that the molecular weight among the crosslinked points becomes high and the crosslink density is adjusted by the crosslinking agent as described above, so that the resulting acrylic sheet has a high molecular weight among the crosslinked points and has excellent stress dispersibility.

Because the crosslinking reaction proceeds with the evaporation of the solvent, the viscosity of the adhesive composition abruptly increases for a short period of time after the casting procedure, whereby the particles homogeneously dispersed in the coating solution cannot move and the particles can be kept in the homogeneously dispersed state in the polymer structure. That is, the acrylic sheet of the invention can be prepared independent of the light transmission of the filler, so that a sheet in which particles having specifically defined specific gravity and particle diameter are homogeneously dispersed can be obtained.

In the preparation of the acrylic sheet of the invention, after the particles are dispersed, the fine air bubbles contained in the resulting dispersion are removed in the defoaming procedure, so that air bubbles are not substantially contained in the sheet-forming resin. However, when tension is given to the acrylic sheet of the invention, the tension is dispersed by the particles homogeneously dispersed in the resin matrix, and the dispersed stress is absorbed by the whole sheet owing to the crosslinked structure formed by the polyfunctional compound. Accordingly, the sheet of the invention shows remarkably excellent mechanical strength.

BRIEF DESCRIPTION OF THE DRAWINGS

Each of FIG. 1

DESCRIPTION OF THE PREFERRED EMBODIMENTS

Figure 1:
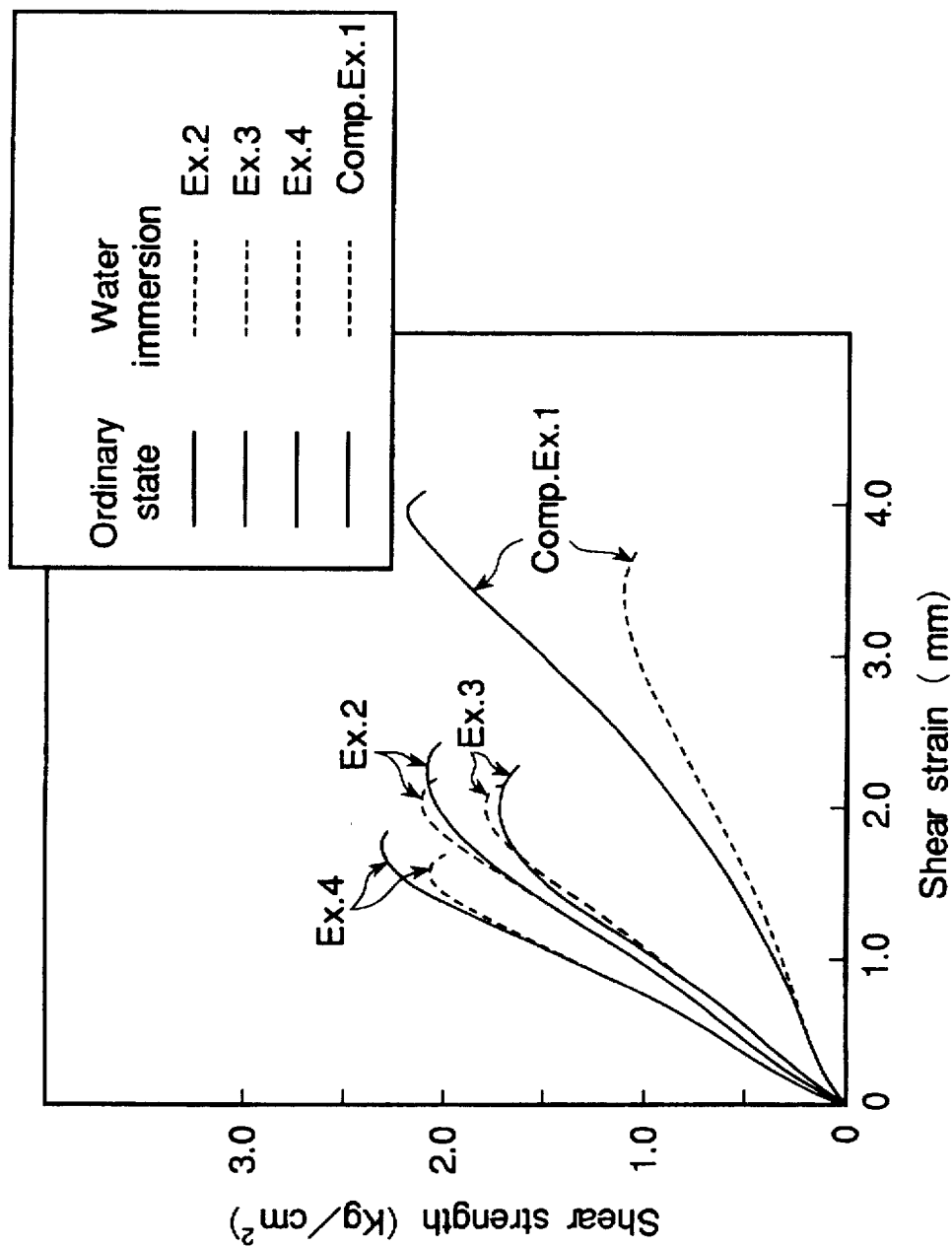

The acrylic sheet, the acrylic adhesive sheet and the processes for preparing these sheets according to the present invention will be described in detail hereinafter.

As described above, the pressure-sensitive adhesive sheets using an emulsion polymer as a starting material have been applied for patent. In these pressure-sensitive adhesive sheets, the air bubbles are incorporated to enhance the shape-following properties of the sheet to the protrusions and depressions on the adherend surface, while the strength which is apt to be lowered by the incorporated air bubbles is supplemented by using a highly elastic polymer and by forming a crosslinked structure, whereby the properties of the resulting sheet are well balanced.

When the adhesion properties of the pressure-sensitive adhesive sheet obtained by laminating an adhesive layer on the air bubble-containing sheet are compared with those of the adhesive sheet having glass micro-bubbles dispersed in the adhesive layer, the sheets are markedly different particularly in the peel strength under constant load, and the air bubble-containing adhesive sheet moves with time on the interface apart from the adherend, while the pressure-sensitive adhesive sheet containing glass micro-bubbles dispersed therein is almost free from moving of the sheet apart from the adherend.

Such difference in the adhesion properties is presumably caused by the difference in the stress dispersion mechanism between the air bubbles and the glass micro-bubbles dispersed in each sheet.

Accordingly, it is presumed that if a sheet is prepared from a mixture containing particles dispersed in an emulsion polymer, the resulting sheet has adhesion properties almost the same as those of the pressure-sensitive adhesive sheet containing glass micro-bubbles dispersed therein. However, it has been found that when 20–60% by volume of particles are added to a matrix composed of a conventional emulsion polymer or a mixture of said polymer and a crosslinking agent, the elasticity of the resulting sheet becomes too high, whereby elongation of the sheet is inhibited and relaxation of the stress hardly takes place, resulting in decrease of adhesion properties. On the other hand, it has also been found that if a viscoelastic material having a low glass transition temperature (Tg) is used as a matrix, as in the case of a pressure-sensitive emulsion adhesive, and particles are dispersed in the matrix to prepare a sheet, both high elongation and large stress relaxation can be attained, but the mechanical strength is deteriorated due to insufficient cohesion of the matrix. If a crosslinking agent is added to form a crosslinked structure in the polymer for forming the emulsion adhesive, the mechanical strength is enhanced. In this case, however, in order to complete the crosslinking reaction for a short period of time, it is necessary to make the drying temperature high, to conduct two-stage heating or to retard the line speed so as to prolong the heating time. These changes in the heating process result in considerably high production cost and are economically disadvantageous. Further, it is very difficult to prepare a sheet having constant properties. For example, change in the properties of the sheet is confirmed by thermal aging test.

Further, if a large amount of particles are added to the emulsion polymer, a content of air bubbles in the matrix becomes high, because the air bubbles are entrained with the particles. In the conventional air bubble-containing sheet, a highly elastic polymer matrix is used, so that certain deterioration of the mechanical strength owing to the air bubbles dispersed in the matrix is overcome in use, or rather the air bubbles exert favorable effects in the shape-following properties of the sheet to the adherend or in uniting the sheet having an open-cell structure with the pressure-sensitive adhesive.

However, when a small force is continuously applied to a sheet which contains particles dispersed in a resin matrix formed from a viscoelastic substance having a low glass transition temperature and into which air bubbles are incorporated, the sheet is extended and the air bubbles are deformed due to the low elasticity of the matrix polymer. As a result, a phenomenon that the sheet is torn from the deformed air bubbles and is finally broken, takes place. Further, in an adhesive sheet formed by laminating a pressure-sensitive adhesive on a sheet, there is a difference between the area having air bubbles and the area having no air bubbles in the interlaminar strength between the sheet and the adhesive layer, so that the pressure-sensitive adhesive moves to the adherend side in the area having air bubbles, whereby the pressure-sensitive adhesive easily peels off from the sheet.

Furthermore, in the case where a mixture of an emulsion polymer and particles is cast to form a sheet, the mixture generally needs to be imparted with thixotropic properties. When the viscosity of the emulsion polymer is low, even if glass micro-bubbles (specific gravity: not less than 0.4) are added in amounts of 45 to 55% by volume, increase of the viscosity of the mixture is small, and therefore another type of a thickening agent must be added. Since the emulsion polymer is an aqueous dispersion, a water-soluble thickening agent is usually added, but the water-soluble thickening agent sometimes causes lowering of water resistance of the sheet. If a thickening agent in the form of fine particles is used, the agglomeration force becomes extremely high owing to the interaction between the polymer matrix and the particulate thickening agent, thereby breaking the balance of the mechanical strength of the sheet.

The adverse effects caused by the air bubbles as described above are exerted also when an acrylic copolymer for forming a resin matrix is prepared using an organic solvent.

When the filler is dispersed in a resin, the shape and the particle diameter of the filler, the kind and the molecular weight of the resin, the viscosity of the resin solution, etc. have great influences on the dispersibility of the filler. That is, by the proper selection of these factors, the filler can be dispersed in the resin in a stable state for a long period of time.

The present inventor has found that a sheet obtained by a process comprising preliminarily preparing a resin having a given molecular weight, adding a particulate filler having a specific particle-diameter and a specific particle shape to the resin, stabilizing the state of the dispersed filler, defoaming the resulting dispersion and forming a crosslinked structure in the resin, is almost free from peel under constant load, because even if a load is applied to the sheet for a long period of time, the load is dispersed by the particles, and the dispersed stress is absorbed by the molecules of the resin having the crosslinked structure.

That is, according to the invention, for preparing an acrylic sheet for forming a support of an acrylic adhesive sheet by adding particles to an emulsion polymer or a polymer solution in an organic solvent, a relatively high-molecular (meth)acrylic copolymer having a weight-average molecular weight of 150,000 to 1,200,000 as a polymer for forming a resin matrix is prepared from a (meth)acrylic acid alkyl ester as a major component, 0.1–15% by weight of an $\alpha,\beta$-unsaturated carboxylic acid and, if necessary, another monomer; particles are added to an aqueous emulsion or an organic solvent solution of this (meth)acrylic copolymer (reaction solution) to homogeneously and stably disperse the particles in the reaction solution; the resulting dispersion is defoamed; the deformed dispersion is cast; and water or the organic solvent is removed, while a crosslinked structure is formed among the molecules of the acrylic copolymer by a polyfunctional compound such as polyglycidylamine. Thus, a sheet substantially not containing air bubbles is prepared. An adhesive sheet obtained by providing an adhesive-layer on the sheet prepared by the above process is flexible at low temperatures, has resistance to peel force and shear force, and is excellent in adhesion strength, creep resistance (holding power) and peel resistance under constant load.

The acrylic sheet of the invention comprises a (meth)acrylic acid alkyl ester, a polymerizable monomer having a functional group and, if necessary, another monomer copolymerizable therewith, and a crosslinked structure is formed in this copolymer using a specific crosslinking agent.

As the (meth)acrylic acid alkyl ester, a compound having an alkyl group of 1 to 12 carbon atoms is preferably used. Examples of the preferred (meth)acrylic acid alkyl esters having alkyl groups of 1 to 12 carbon atoms include methyl (meth)acrylate, ethyl (meth)acrylate, n-butyl (meth)acrylate, isopropyl (meth)acrylate, tert-butyl (meth)acrylate, 2-ethylhexyl (meth)acrylate, n-octyl (meth)acrylate, isononyl (meth)acrylate and lauryl (meth)acrylate.

These (meth)acrylic acid alkyl esters may be used singly or in combination.

The polymerizable monomer having a functional group used together with the (meth)acrylic acid alkyl ester is a compound having a functional group reactive to the polyfunctional compound described later and having an ethylenic double bond copolymerizable with the (meth)acrylic acid alkyl ester.

Examples of the functional groups of the acrylic monomers include a carboxyl group, an amide group, a hydroxyl group, a N-alkylol group, a glycidyl group, a group having a halogen atom, and an alkoxysilyl group.

The acrylic monomer having a carboxyl group as a functional group is, for example, an $\alpha,\beta$-unsaturated carboxylic acid, and this $\alpha,\beta$-unsaturated carboxylic acid generally has about 1 to 2 carboxyl groups. Examples of the $\alpha,\beta$-unsaturated carboxylic acids include acrylic acid, methacrylic acid, $\alpha$-ethylacrylic acid, crotonic acid, $\alpha$-methylcrotonic acid, $\alpha$-ethylcrotonic acid, isocrotonic acid, tiglic acid, angelic acid, maleic acid, fumaric acid, itaconic acid, citraconic acid, mesaconic acid, glutaconic acid and dihydromuconic acid. Of these, preferred are acrylic acid and methacrylic acid. These carboxyl group-containing monomers may be used singly or in combination.

Examples of the monomers having an amide group include acrylamide and t-butyl(meth)acrylamide.

Examples of the monomers having a hydroxyl group include hydroxyethyl (meth)acrylate, hydroxypropyl (meth)acrylate, hydroxybutyl (meth)acrylate, ethylene glycol monoallyl ether, diethylene glycol monoallyl ether and glycerol monoallyl ether. Examples of the monomers having an N-alkylol group include N-methylol(meth)acrylamide and N-butylol(meth)acrylamide.

Examples of the monomers having a glycidyl group as a functional group include glycidyl (meth)acrylate and allyl glycidyl ether. Examples of the monomers having a group with a halogen atom include vinyl chloride, vinyl bromide, allyl chloride, allyl bromide, 2,3-dibromopropyl (meth)acrylate, 2,3-dichloropropyl (meth)acrylate, 2-chloroethyl (meth)acrylate, 3-chloro-2-hydroxypropyl (meth)acrylate, chloromethylstyrene, 2-bromoethyl (meth)acrylate and vinyl fluoride.

Examples of the monomers having an alkoxysilyl group include alkoxyalkylsilane (e.g., methoxymethylsilane), vinyltrimethoxysilane, vinyltriethoxysilane and 6-methacryloxypropyltrimethoxysilane.

Of the polymerizable monomers having a functional group, particularly preferred are $\alpha,\beta$-unsaturated carboxylic acids.

Examples of the copolymerizable monomers which may be used if necessary include monomers having a nitrile group, an N-methoxy group, an N-methoxyalkyl group, a phenyl group and an alkoxy group. Of these monomers, monomers having a nitrile group, an amide group, a hydroxyl group and an alkoxy group are hydrophilic, so that the (meth)acrylic copolymer prepared using monomers having these groups in an aqueous medium can facilitate the emulsion polymerization. Further, the dispersing stability of the emulsion can be improved not only during the polymerization but also after the polymerization. Moreover, since the (meth)acrylic copolymer prepared by copolymerizing the monomers having such groups exhibits good affinity for the particles dispersed therein, good stability of the dispersed particles can be obtained.

The monomers having an N-methoxyalkyl group have self-crosslinking properties, and therefore copolymerization of such monomers can improve the agglomeration force required for sheet-forming polymers.

By copolymerizing monomers having a phenyl group, a nitrile group or a group having a halogen atom, the glass transition temperature (Tg) of the resulting polymer can be raised, and elasticity of the sheet-forming polymer can be varied.

Examples of the monomers having such groups and copolymerizable with the (meth)acrylic acid alkyl ester and the polymerizable monomer having a functional group include:

monomers having a nitrile group, such as (meth)acrylonitriles;

monomers having an N-methoxyalkyl group, such as an N-methoxymethyl(meth)acrylamide, N-methoxyethyl (meth)acrylamide, N-methoxypropyl(meth)acrylamide and N-methoxybutyl(meth)acrylamide;

monomers having a phenyl group, such as styrene, α-methylstyrene, phenyl (meth)acrylate and benzyl (meth)acrylate; and monomers having an alkoxy group, such as methoxyethyl (meth)acrylate and ethoxyethyl (meth)acrylate.

For preparing the (meth)acrylic copolymer for forming the acrylic sheet of the invention, the (meth)acrylic acid alkyl ester is used in an amount of 60 to 99.9% by weight, preferably 70 to 99.5% by weight; the polymerizable monomer having a functional group is used in an amount of 0.1 to 15% by weight, preferably 0.5 to 10% by weight; and the other monomer is used in an amount of 0 to 39.9% by weight, preferably 0 to 29.5% by weight. When the amount of the (meth)acrylic acid alkyl ester is less than 60% by weight, the glass transition temperature (Tg) of the resulting (meth)acrylic copolymer becomes high and the flexibility thereof at low temperatures is lowered. When the amount of the polymerizable monomer having a functional group is less than 0.1% by weight, the cohesion force of the resulting polymer is markedly lowered thereby to deteriorate the polymer properties. When the amount thereof exceeds 15% by weight, the water resistance of the resulting polymer is lowered. That the amount of the other monomer exceeds 39.9% by weight means that the amount the (meth)acrylic acid alkyl ester or the amount of the polymerizable monomer having a functional group relatively is reduced, and this results in that the resulting polymer does not show the desired properties.

In the invention, the (meth)acrylic copolymer is prepared using the above-mentioned monomers. In the preparation of the (meth)acrylic copolymer, the monomers may be dispersed and copolymerized in an aqueous medium or in an organic solvent.

Next, preparation of the (meth)acrylic copolymer by emulsion polymerization in which the monomers are dispersed in an aqueous medium is described-in detail.

In the preparation of a (meth)acrylic copolymer by emulsion polymerization, an emulsifier is generally used when the monomers are dispersed in an aqueous medium, so that the emulsifier sticks to the surfaces of the resulting polymer particles. If a sheet is formed from such polymer particles having the emulsifier thereon, the emulsifier bleeds out on the surface of the sheet by, for example, a change of the environmental conditions such as repetition of the thermal cycle of low temperatures and high temperatures, whereby the adhesion properties of the pressure-sensitive layer are sometimes deteriorated. In the invention, therefore, a reactive emulsifier is preferably used when the monomers are dispersed in the aqueous medium. By the use of the reactive emulsifier, the bleed phenomenon does not take place.

The reactive emulsifier employable in the invention has a hydrophilic group (i), a lipophilic group (ii) and a functional group (iii) copolymerizable with the above monomers.

The hydrophilic group (i) is, for example, a polyoxyalkylene group. The lipophilic group (ii) is, for example, an alkylphenyloxy group, an alkylphenyl group or an alkyl group. The functional group (iii) copolymerizable with the above monomers is, for example, a radical polymerizable functional group having an ethylenic double bond. The hydrophilic group (i) and the lipophilic group (ii) may be linked directly, or may be linked through a substituted or unsubstituted hydrocarbon group. Examples of the substituted or unsubstituted hydrocarbon groups include alkylene groups having 1 to 5 carbon atoms such as ethylene. One or more hydrogens of the alkylene group may be replaced by a radical polymerizable substituent such as a substituent having a vinyl group (e.g., $CH_2=CH—CH_2—O—CH_2—$). The lipophilic group (ii) may have a radical polymerizable substituent such as isopropenyl.

The reactive emulsifier may be either anionic, nonionic or cationic. However, the (meth)acrylic copolymer used in the invention is generally prepared by copolymerizing an α,β-unsaturated carboxylic acid, and in this case, an anionic or nonionic reactive emulsifier is preferably employed.

Listed below are examples of the reactive emulsifiers. In the following formulas, "Ph" means phenylene.

(1) $CH_2=CH—COO—(C_2H_4O)_6—Ph—C_9H_{19}$
(2) $CH_2=CH—COO—(C_2H_4O)_8—Ph—C_9H_{19}$
(3) $CH_2=CH—COO—(C_2H_4O)_{16}—Ph—C_9H_{19}$
(4) $CH_2=CH—COO—(C_2H_4O)_{15}—C_{12}H_{25}$
(5) $CH_2=CH—COO—(C_2H_4O)_2—C_8H_{17}$

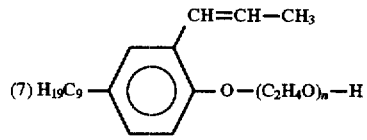

wherein n is about 10, 20, 30 or 40.

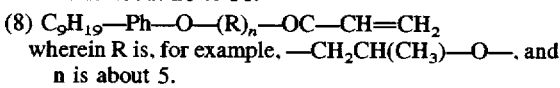

wherein n is about 20 to 50.

(8) $C_9H_{19}—Ph—O—(R)_n—OC—CH=CH_2$
wherein R is, for example, $—CH_2CH(CH_3)—O—$, and n is about 5.

Details of the reactive emulsifiers are described in Japanese Patent Application No. 293475/1993.

The reactive emulsifier is used in an amount of usually 0.1 to 70 parts by weight, preferably 0.2 to 20 parts by weight, based on 100 parts by weight of a mixture of the monomers. When the amount of the reactive emulsifier is less than 0.1 part by weight, stability of the polymerization solution is not sufficiently obtained. When the amount thereof exceeds 70% by weight, the polymerization stability is lowered, and the sheet is sometimes deteriorated in anchoring properties, resulting in insufficient adhesion strength between the adhesive and the sheet.

In the invention, the reactive emulsifier mentioned above is preferably used as the emulsifier, but a conventional emulsifier having no reactivity may be used for the emulsifying in such an amount that the water resistance of the resulting sheet is not lowered. The emulsifier having no reactivity can be used in combination with the reactive emulsifier.

In the emulsion polymerization of the monomer mixture, a polymerization initiator is used. As the polymerization initiator, conventionally known initiators are employable, and examples thereof include persulfate type initiators such as potassium persulfate and ammonium persulfate and azo-bis type initiators such as azobiscyanovalerianic acid and its salt. The kind and the amount of the polymerization initiator can be determined depending on the reaction conditions and the properties thereof.

The acrylic sheet of the invention has excellent water resistance. The water resistance of the sheet can be improved by conducting emulsion polymerization using such a reactive emulsifier as mentioned above, or it can be improved by decreasing the diameters of the emulsion particles in the emulsion polymerization. Thus, when the sheet is formed from the emulsion polymer obtained by emulsion polymerization, it is desired the pores (voids) formed by evaporation of a medium (water or water/organic solvent) present in the emulsion in the film forming procedure are as small as possible or no pore is formed. In order to form no pore, the mean diameter of the emulsion polymer particles is adjusted to usually not more than 0.5 μm, preferably not more than 0.3 μm.

Such an emulsion polymer having small particle diameter has a high viscosity and thixotropic properties, and therefore it is suitable as a sheet forming emulsion polymer. The emulsion polymer having a mean particle diameter of not more than 0.3 μm has a nonvolatile content (solids content) of usually 40 to 50%, preferably 50 to 60%. When the nonvolatile content is not more than 40%, the viscosity of the emulsion tends to lower. For example, even if the particles are added in amounts of not less than 30% by volume, thixotropic properties sufficient for coating cannot be obtained depending on the circumstances. When the nonvolatile content exceeds 65%, the viscosity becomes too high. In this case, if the particles are added in amounts of not less than 30% by volume, the coating operation cannot be carried out depending on the circumstances. The emulsion polymer having a mean particle diameter of not more than 0.3 μm can be prepared by ordinary emulsion polymerization with the proviso that the reactive emulsifier is added in a large amount, but a polymer emulsion having more preferable mean particle diameter can be obtained by using seed emulsion polymerization and controlling the particle growth with care.

In the film-forming procedure, particles of the emulsion polymer prepared as above are bonded together on their interfaces to form a united film. This is greatly different from a case where a film is formed from a uniform solution in which a polymer is uniformly dissolved in a solvent, such as a solvent type polymer solution or an ultraviolet curing polymer solution. Especially in the case of using the emulsion polymer, emulsion polymerization suitable for this emulsion type film-forming procedure is required to be carried out. For example, the polymerization can be carried out at a reaction temperature of 75° to 85° C. for a reaction time of usually 1 to 12 hours, preferably 3 to 8 hours.

An emulsion obtained immediately after the emulsion polymerization generally has a pH-value of not more than 7, but if the pH value is of such a low level, the mechanical stability is sometimes deteriorated, and a sheet formed from this unstable emulsion is lowered in the water resistance. In the invention, therefore, the pH value of the emulsion obtained immediately after the emulsion polymerization is preferably adjusted to not less than 7. The emulsion can be adjusted to have a pH value of not less than 7 by using, for example, an ammonia water.

The (meth)acrylic copolymer thus obtained has a glass transition temperature (Tg) of usually −80° to +10° C., preferably −60° to 0° C.

In the present invention, the (meth)acrylic copolymer can be also prepared by solution polymerization process in which the monomers are dissolved in an organic medium.

The organic solvent type polymer synthesized using an organic solvent has various advantages. For example, the polymerizable monomer having a functional group may be added relatively freely; the polyfunctional compound and the crosslinking reaction conditions can be determined with less limitation because the organic solvent is used; the coating operation can be carried out even if the viscosity is higher than that of the emulsion polymer prepared in an aqueous media; and the functions of the particles to be imparted to the resin can be extended. Accordingly, by the use of the organic solvent, designing of an acrylic sheet can be made more freely, and therefore an acrylic sheet satisfying various demands can be prepared.

For utilizing such an advantage that the designing of an acrylic sheet can be made more freely, a (meth)acrylic copolymer to which a carboxyl group is introduced in a large amount can be prepared. The (meth)acrylic copolymer containing such a large amount of carboxyl group has high cohesion force, so that an acrylic sheet of single-layer structure can be easily prepared by adding a crosslinking agent and the particles to this organic solvent type polymer. The acrylic sheet of single-layer structure thus prepared generally shows autohesion properties, and hence this single-layer acrylic sheet can function as an adhesive sheet as it stands without providing any adhesive layer thereon. Because the single-layer acrylic sheet having autohesion properties generally shows high adhesion strength even if an adhesive layer is not provided, the cost for providing an adhesive layer can be reduced.

The organic solvent-type polymer hardly gives rise to a problem of reduced water resistance, as in a sheet formed from an emulsion polymer having some affinity with water.

By the way, differently from the emulsion polymer, the organic solvent type polymer is a uniform type polymer. Therefore, in the acrylic sheet formed from the organic solvent type polymer, the resin matrix has a more dense film structure. When the thickness of a sheet exceeds 0.1 mm, a dense film is formed on the surface in the drying procedure, whereby the organic solvent inside is hardly evaporated. As a result, the remaining solvent causes swelling of the sheet or lowering of surface glossiness. The organic solvent is generally has a lower surface tension than water, and it is apt to be thought that the air bubbles remaining in the organic solvent easily disappear. However, when the molecular weight of the (meth)acrylic copolymer is high as in the present invention, the viscosity of the organic solvent solution of the polymer becomes high, and therefore the air bubbles once introduced hardly disappear at room temperature and atmospheric pressure.

In the present invention, accordingly, it is necessary that after the polyfunctional compound for forming a crosslinking structure and the particles are dispersed in the organic solvent solution of the specific (meth)acrylic copolymer, the resulting organic solvent solution is defoamed to reduce the air bubble content, and the solution is cast to form an acrylic sheet.

In the process for preparing an acrylic sheet using an organic solvent according to the invention, the (meth)acrylic acid alkyl ester, the polymerizable monomer having a functional group and if necessary other monomer in specific amounts are copolymerized in an organic solvent to prepare a reaction solution or dispersion in which a (meth)acrylic copolymer produced is dissolved or dispersed in the organic solvent.

The organic solvent used for the solution polymerization is an organic solvent capable of dissolving or dispersing (preferably dissolving) the monomers and the copolymer produced by the reaction. Examples of such organic solvents include acetates such as ethyl acetate and butyl acetate; aromatic hydrocarbons such as toluene and xylene; ketones such as methyl ethyl ketone; aliphatic hydrocarbons such as n-hexane, n-heptane and n-octane; and alicyclic hydrocarbons such as cyclohexane. Taking the solubility of the monomers into account, polar solvents, for example, alcohols such as methanol, ethanol and isopropyl alcohol, and dioxane, dimethyl sulfoxide, dimethylformamide, N-methylpyrrolidone and ethylene glycol, and further water can be used in combination with the organic solvents. The solvents may be used singly or in combination according to the mixing ratio of the (meth)acrylic acid alkyl ester and other monomers.

In the polymerization of the above monomers, a polymerization initiator is generally employed. As the polymerization initiator, conventionally known initiators can be employed, and examples thereof include azo type initiators such as azobisisobutylonitrile and azobiscyanovalerianic acid, and peroxide type initiators such as benzoyl peroxide. The type and the amount of the polymerization initiator can be determined depending on the reaction conditions and the properties thereof.

The reaction of the above monomers is carried out at a reaction temperature of 70° to 85° C. for a reaction time of 3 to 12 hours.

The reaction solution containing the (meth)acrylic copolymer having a functional group as prepared above has a nonvolatile content (solids content) of usually 20 to 80%, preferably 30 to 70%. The solids content can be controlled by adjusting the amount of the organic solvent and the amount of the monomers. When the nonvolatile content is less than 20%, drying characteristics are deteriorated in the sheet forming procedure, and the viscosity of the reaction liquid is apt to be lowered. For example, even if the particles having a mean particle diameter of 10 to 100 μm are added in amounts of not less than 30%, a viscosity suitable for the coating operation cannot be obtained depending upon circumstances. When the nonvolatile content exceeds 80%, the viscosity of the reaction solution becomes too high. In this case, if the particles are added in amounts of not less than 30%, the coating operation can be hardly carried out depending upon the circumstances.

The (meth)acrylic copolymer prepared in the aqueous medium or the organic solvent needs to be adjusted to have a weight-average molecular weight of 150,000 to 1,200,000, preferably 200,000 to 1,000,000. In the solution polymerization, the viscosity of the solution tends to be higher, as the molecular weight of the copolymer is increased. Therefore, it is desired that the nonvolatile content (resin content) is adjusted in accordance with the molecular weight so that the viscosity of the solution containing the particles suitable for the coating operation can be obtained.

Depending on the weight-average molecular weight of the (meth)acrylic copolymer prepared, the stability of the dispersed particles markedly varies, and the stress dispersion properties of the acrylic sheet also markedly vary. If the weight-average molecular weight of the (meth)acrylic copolymer is less than 150,000, the dispersed state of the particles is hardly kept stably. Accordingly, for ensuring a desired level of the mechanical strength of the resulting sheet, the crosslink density is required to be high, and the copolymerization amount of the monomer having a functional group and the amount of the polyfunctional compound both forming the (meth)acrylic copolymer should be increased. In the mixture containing large amounts of the crosslinked structure forming components, the crosslinking reaction proceeds for a long period of time. Therefore, the molecular weight and the structure of the resin for forming the resin matrix vary, the properties of the acrylic sheet are hardly stabilized, or the properties of the sheet strikingly vary with change in the environmental conditions such as change in storage conditions or thermal conditions. When the weight-average molecular weight is less than 150,000, the stability of the dispersed particles is deteriorated. For example, the particles easily agglomerate or are sedimented before or after casting, whereby the particles cannot be homogeneously dispersed in the sheet. When the weight-average molecular weight of the (meth)acrylic copolymer exceeds 1,200,000, coating operation of the copolymer cannot be substantially carried out.

It is preferable that the weight-average molecular weight of the (meth)acrylic copolymer is adjusted to be in the range of 200,000 to 1,000,000, because good stability of the dispersed particles can be obtained and the mechanical strength of the resulting sheet can be improved.

The (meth)acrylic copolymer obtained above has a glass transition temperature (Tg) of usually −80° to +10° C., preferably −60° to 0° C. That is, this (meth)acrylic copolymer shows excellent elasticity at room temperature.

The aqueous emulsion of the (meth)acrylic copolymer has a viscosity of usually 30 to 30,000 cps, preferably 50 to 20,000 cps, at 25° C. The organic solvent solution of the (meth)acrylic copolymer has a viscosity of usually 300 to 30,000 cps, preferably 500 to 20,000 cps, at 25° C. By adjusting the viscosity of the aqueous emulsion or the organic solvent solution of the (meth)acrylic copolymer as above, the dispersibility of the particles and the stability of the dispersed particles can be improved.

In the preparation of the acrylic sheet of the invention, particles are added to the (meth)acrylic copolymer. The particles used for forming the acrylic sheet includes solid particles, hollow particles and porous particles, and they can be used singly or in combination.

The particles need to have a mean particle diameter of 1 to 100 μm, preferably 5 to 80 μm. If the particles having a mean particle diameter of 1 to 100 μm are added to the aqueous emulsion or the organic solvent solution of the (meth)acrylic copolymer, thixotropic properties are improved. The smaller the diameters of the particles, the better the thixotropic properties.

For example, when the particles having a mean particle diameter of less than 1 μm are added to the aqueous emulsion of the (meth)acrylic copolymer, the viscosity of the mixture strikingly increases. For applying a coating mixture having such a high viscosity, the mixture must be diluted with water or an organic solvent, and in this case the nonvolatile content is reduced and the drying characteristics are deteriorated. Moreover, the resulting sheet becomes poor in flexibility and extensibility, whereby the sheet has high elasticity and poor balance among the properties. When the mean particle diameter exceeds 100 μm, the thixotropic properties cannot be obtained, so that another kind of a thixotropic agent must be added. Moreover, the particles are sedimented by their own gravity, and protrusions and depressions are formed on the surface of the resulting sheet, that is, a sheet of smooth surface is hardly obtainable. Additionally, the shear strength at the low strain is lowered.

The solid particles employable in the invention are particles substantially not containing air bubbles. Examples of the solid particles include particles of fine powders of conductive metals such as copper, nickel, aluminum, chromium, iron and stainless steel; particles of metal oxides; particles of carbides such as silicon carbide, boron carbide and nitrogen carbide; particles of nitrides such as aluminum nitride, silicon nitride and boron nitride; particles of ceramics such as oxides (e.g., alumina and zirconia); particles of inorganic compounds such as calcium carbonate, aluminum hydroxide, glass and silica; particles of natural materials such as volcanic Shirasu and sand; and polymer particles such as PMMA particles, PSt particles, phenol resin particles, benzoguanamine resin particles, urea resin particles, silicone resin particles, nylon particles, polyester particles, polyurethane particles, polyethylene particles, polypropylene particles, polyamide particles and polyimide particles. Also employable are surface modified particles and composite particles obtained by modifying surfaces of various particles with functional substances such as metal, pigment, dye, flame retardant and semiconductor, which may be obtained using a polymerization process or a powder surface modifying machine.

Of the solid particles, acrylic crosslinked particles having a refractive index near to that of the acrylic polymer are favorably used in the case where transparency is required, because a sheet of high transparency can be obtained by dispersing such particles in the acrylic copolymer matrix.

The refractive index Np of the particles used for forming a sheet of high transparency and the refractive index Nm of the resin matrix preferably satisfy the relation |Nm−Np|≦0.05.

The sheet can be made flame-retardant by adding solid particles of inorganic compounds such as aluminum hydroxide.

The hollow particles employable in the invention are particles each having a hollow portion at least inside thereof. The hollow particles have a true specific gravity of usually about 0.1 to 1.5, preferably about 0.2 to 1.2.

The hollow particles can be prepared from various materials such as amorphous inorganic materials, crystalline inorganic materials and polymer materials. Examples of the hollow particles include glass balloons which are typical amorphous hollow particles, Shirasu balloons synthesized from natural substances, ceramic balloons having a crystalline ingredient, polymer particle balloons, organic balloons and carbon balloons. Also employable are composite hollow particles obtained by using these balloons as core materials and modifying the surfaces of the balloons with various inorganic materials, organic materials, metallic materials, ceramics, etc.

For example, the shape of the hollow particles to be added to the emulsion polymer has a great influence on the thixotropic properties. For example, the emulsion having been adjusted to impart improved water resistance to the resulting sheet shows thixotropic properties, but it tends to be lowered in the viscosity. Even if the hollow particles of smooth surfaces are added to such emulsion, the viscosity of the emulsion can be hardly increased.

In the present invention, hollow particles having low surface smoothness are preferably used in the emulsion. For example, Shirasu balloons having a large number of fine pores on their surfaces can be prepared by subjecting natural Shirasu to particle size adjustment followed by calcining, and such Shirasu balloons having a large number of fine pores on their surfaces are particularly preferably used in the invention. By adding the Shirasu balloons having a large number of fine pores on their surfaces to the emulsion, the viscosity of the resulting mixture is increased, and excellent thixotropic properties are imparted to the mixture, whereby the mixture can be remarkably improved in the coating properties. The Shirasu balloons having a large number of fine pores on their surfaces, which are preferably used in the invention, have a true specific gravity of usually 0.4 to 0.8, and this is higher than the true specific gravity (not more than 0.2) of glass micro-bubbles conventionally used. Therefore, if the Shirasu balloons having a large number of fine pores on their surfaces are added in the same amount (% by volume) as the glass micro-bubbles conventionally used, this volumetric amount of the Shirasu balloons equals to about 2 to 3.5 times as much as the glass micro-bubbles in terms of % by weight. The Shirasu balloons having a large number of fine pores can be prepared at a relatively low cost, so that the cost for preparing the acrylic sheet of the invention can be reduced.

Owing to a large number of pores formed on the surfaces of the Shirasu balloons, the dispersibility of the Shirasu balloons in the polymer matrix can be improved. Further, if the Shirasu balloons (hollow particles) are used as core materials, ultrafine particles can be easily fixed onto the surfaces of the hollow particles thereby to conduct surface modification of the hollow particles. Furthermore, the properties of the ultrafine particles to be fixed onto the surfaces of the hollow particles can be easily imparted to the hollow particles, whereby the resulting hollow particles can have various functions.

In the present invention, porous particles are also employable. The porous particles can be prepared from various materials such as amorphous inorganic materials, crystalline inorganic materials, polymer materials, metallic materials and organic materials. Examples of the porous particles include porous particles of amorphous inorganic materials, porous silica particles, porous Shirasu balloons prepared from natural substances, porous cellulose particles, porous PMMA particles, porous PSt particles and porous nickel. Also employable are composite porous particles obtained by using these porous particles as core materials and modifying the surfaces of the particles with various inorganic materials, organic materials, metallic materials, ceramics, etc.

The solid particles, the hollow particles and the porous particles may have any shape, but preferably are spherical from the view point of the stress dispersion of the sheet to the three-dimensional directions. Particularly preferred are monodisperse particles having uniform diameters, though they are expensive. In the case of the solid particles or the hollow particles, the form of the particle has great influence on the interaction between the polymer matrix and the particles, but in general, particles of smooth surfaces are employed.

The surface modified particles and the composite particles both having ultrafine particles fixed onto their surfaces are excellent in the dispersibility and the dispersion stability in the resin matrix and can have various functions due to the ultrafine particles. Also available are agglomerates obtained by granulating ultrafine particles or fine particles.

The solid particles, the hollow particles or the porous particles used in the invention need to have a true specific gravity of 0.2 to 3, preferably 0.5 to 1.5.

The true specific gravity is a value obtained by dividing the particle weight by the particle volume. When plural kinds of the particles are used, the specific gravity means an average value calculated from their true specific gravities and the mixing ratio.

Accordingly, in the case where the solid particles, the porous particles and the hollow particles are used in combination, if the solid particles and the porous particles having a true specific gravity of, for example, 0.8 to 8.0 are used, the hollow particles usable herein have a true specific gravity of usually 0.2 to 1.5. Further, the mixing amounts of the particles are adjusted so that the specific gravity of the whole particles is in the range of 0.2 to 3, preferably 0.5 to 1.5.

When the particles having such true specific gravity and mean particle diameter as defined above are added to the emulsion or organic solvent solution of the (meth)acrylic copolymer having a weight-average molecular weight of 150,000 to 1,200,000, the particles are easily dispersed and the stability of the dispersed particles is kept for a long period of time, whereby an acrylic sheet containing particles homogeneously dispersed in the resin matrix can be obtained. As described above, by setting the weight-average molecular weight of the (meth)acrylic copolymer and the true specific gravity and the mean particle diameter of the particles in the above-defined range, the particles can be homogeneously dispersed in the acrylic sheet.

Depending on the weight-average molecular weight of the (meth)acrylic copolymer and the content of the (meth)acrylic copolymer in the aqueous medium or the organic solvent, the amount of the particles can be determined so that the resulting mixture has a viscosity suitable for the casting operation. The amount of the particles is in the range of usually 15 to 55% by volume, preferably 20 to 50% by volume, more preferably 25 to 50% by volume.

Figure 2:
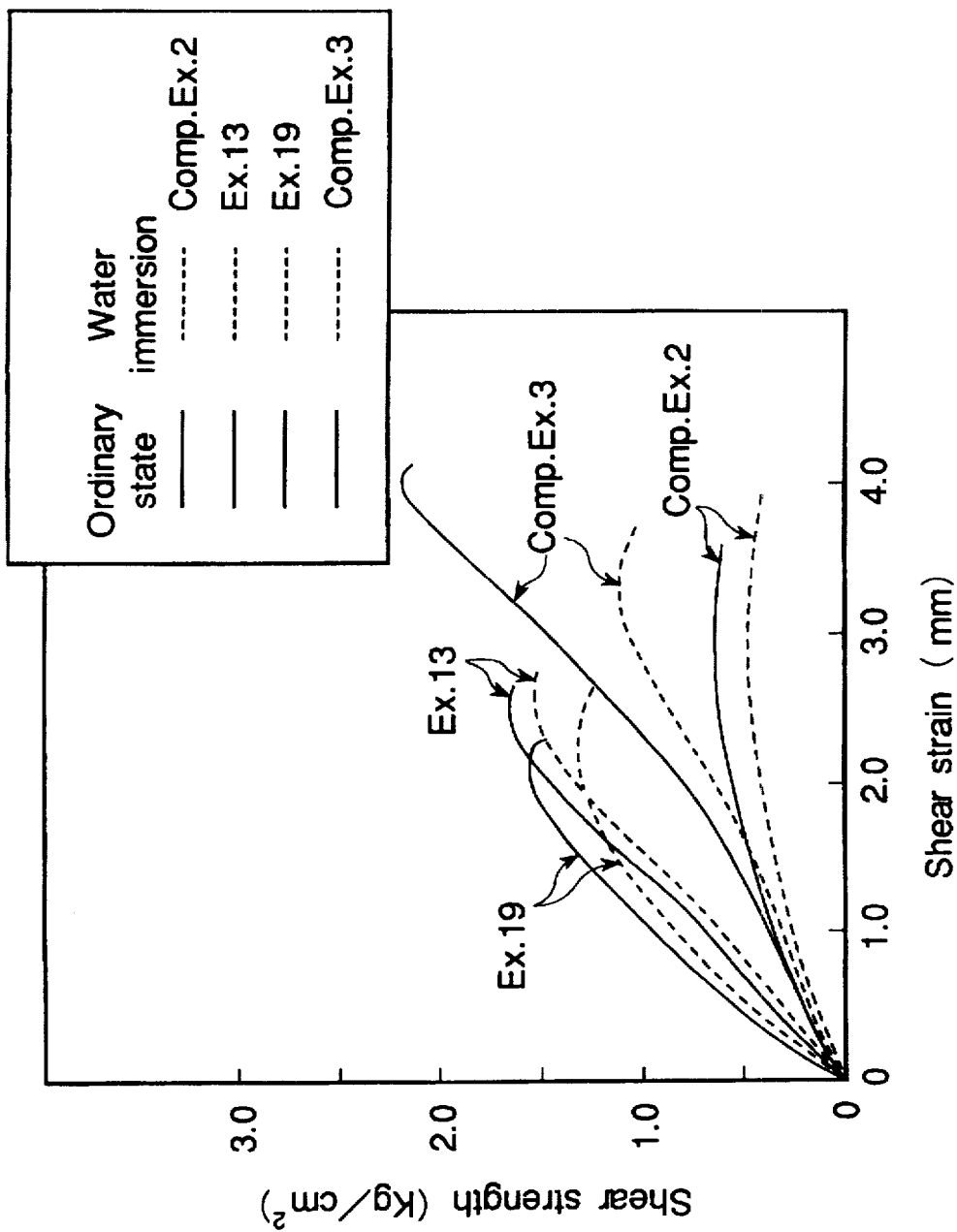
FIG. 2 shows a relation between shear strength and shear strain of the acrylic adhesive sheet of the invention after prepared (ordinary state) and after water immersion.

When the solid particles having the above-defined mean particle diameter are added, the shear strength to the initial low shear strain of the sheet is prominently increased as shown in FIG. 1 depicting the relation between the shear strength and the shear strain. In the sheet containing the solid particles in the above-defined amount, the tensile strength at initial low elongation in the relation between the tensile strength and the tensile elongation is also increased. When the hollow particles having the above-defined mean particle diameter are added, the shear strength to the initial low shear strain of the sheet is prominently increased as shown in FIG. 2 depicting the relation between the shear strength and the shear strain. In the sheet containing the hollow particles in the above-defined amount, the tensile strength to the initial low tensile elongation in the relation between the tensile strength and the tensile elongation is also increased. These increases in strength are presumed to be due to increase of the elastic modulus, and this is supported by the fact that the storage elastic modulus and the loss elastic modulus at about 0° to 50° C. are increased as compared with the results of the viscoelasticity measurement of the sheet containing no particles. Further, there is found a tendency that as the diameter of the particles becomes smaller, the shear strength at low shear strain becomes greater and the tensile strength at low tensile elongation becomes greater, with the proviso that the same amount of the particles is used. Accordingly, the diameter of the particles should be determined from the viewpoint of the sheet properties as well as the cost and the functions. When the amount of the hollow particles is smaller than the above-defined amount, the elasticity of the sheet is lowered, the shear strength to the low strain is weakened, and the stress dispersion properties are deteriorated. When the amount thereof is larger than the above-defined amount, the sheet reduced elongation or tear strength. The same tendency is found in the porous particles.

In the acrylic sheet of the invention, the particles are homogeneously dispersed in a crosslinked acrylic copolymer formed from the (meth)acrylic copolymer and a polyfunctional compound (crosslinking agent).

Examples of the groups which are introduced into the (meth)acrylic copolymer and react with the polyfunctional compound to form a crosslinked structure among the molecules of the (meth)acrylic copolymer include a carboxyl group, an isocyanate group, an epoxy group, a metallic complex (metallic ligand) and an amino group.

For example, when the functional group introduced into the (meth)acrylic copolymer is a carboxyl group, the polyfunctional compound is preferably a polyfunctional epoxy compound, a metallic chelate compound or a polyfunctional isocyanate compound; when the functional group is an amide group, the polyfunctional compound is preferably a polyfunctional isocyanate compound; when the functional group is a hydroxyl group, the polyfunctional compound is preferably a polyfunctional isocyanate compound; when the functional group is an N-alkylol group, the polyfunctional compound is preferably a polycarboxylic acid, an acid anhydride or a metallic chelate compound; when the functional group is a glycidyl group, the polyfunctional compound is preferably an acid anhydride, a metallic chelate compound, an amine compound, a hydrazine compound or an imidazole derivative; when the functional group is a group having a halogen atom, the polyfunctional compound is preferably a polyfunctional epoxy compound or a metallic chelate compound; and when the functional group is an alkoxysilyl group, the polyfunctional compound is preferably a metallic chelate compound or a polycarboxylic acid.

When the functional group is a carboxyl group, the polyfunctional compound is particularly preferably a compound having a glycidyl group, and this compound preferably has two or more epoxy groups and one or more tertiary nitrogen atoms. Accordingly, the polyfunctional compound having reactivity to the polymerizable monomer having the functional group is preferably a polyglycidylamine.

Examples of the polyglycidylamines include N,N-diglycidylaniline, N,N-diglycidyltoluidine, m-N,N-diglycidylaminophenylglycidyl ether, triglycidyl isocyanurate, N,N,N',N'-tetraglycidylaminodiphenylmethane and N,N,N',N'-tetraglycidyl-m-xylenediamine.

The polyfunctional compound is described below in more detail with reference to polyglycidylamine. The polyglycidylamine is used by first dissolving it in an organic solvent and/or a plasticizer which is generally inert to the polyglycidylamine or dissolving it in an organic solvent and/or a plasticizer together with an adhesion imparting agent which is inert to the polyglycidylamine, and then emulsion dispersing the resulting solution in water in the presence of an emulsifier. The adhesion imparting agent used herein is an adhesion imparting agent not containing a group reactive with the polyglycidylamine, such as a carboxyl group or an amino group. The adhesion imparting agent preferably has a high softening point. For example, petroleum type hydrocarbon resins, terpene resins and modified products thereof can be employed. Examples of the organic solvents used herein include aromatic hydrocarbons such as toluene and xylene, and aliphatic and alicyclic hydrocarbons such as n-hexane and cyclohexane. When the solubility of the crosslinking agent is low, polar solvents such as alcohol, dioxane and ethylene glycol may be used in combination, if desired. As the plasticizer used for dissolving the crosslinking agent and if necessary used for dissolving the adhesive imparting agent, there can be mentioned dioctyl phthalate, dibutyl phthalate, dioctyl adipate and terpene type plasticizers.

The organic solvent, the adhesion imparting agent and the plasticizer are preferably hydrophobic.

In the invention, the amount of the organic solvent used is arbitrarily determined, but in general, the hydrophobic organic solvent or plasticizer is used in an amount of about 0.2 to 50 parts by weight based on 1 part by weight of the polyfunctional compound.

The polyfunctional compound is used in an amount of 0.001 to 1.0 part by weight, preferably 0.005 to 0.5 part by weight, based on 100 parts by weight of the (meth)acrylic copolymer. The ratio between the aqueous emulsion or organic solvent solution of the (meth)acrylic copolymer and the organic solvent or plasticizer solution dissolving the crosslinking agent varies depending on the concentrations of the aqueous emulsion, the organic solvent solution and the solution of the crosslinking agent. However, the solution of the crosslinking agent is added in such an amount that 0.001-2 equivalents, preferably 0.005-1.2 equivalents, of the reactive group such as an epoxy group is supplied. The concentration of the crosslinking agent in the solution is generally about 10%, so that the solution of the crosslinking agent is added in an amount of about 10 times as much as the amount of the crosslinking agent.

By the use of the polyfunctional compound in such an amount as above, a crosslinked structure is formed mainly among the molecules of the (meth)acrylic copolymer having the aforesaid weight-average molecular weight. That is, when the polyfunctional compound is used in such an amount as above to form a crosslinked structure mainly among the molecules, the resulting crosslinked (meth) acrylic copolymer retains a degree of molecular freedom capable of dispersing the stress.

In the invention, a mixture of the aqueous emulsion or the organic solvent solution of the (meth)acrylic copolymer, the organic solvent solution of the polyfunctional compound and the particles is subjected to coating operation to form a sheet immediately after defoaming the mixture. Therefore, although the polyfunctional compound is mixed with the aqueous solvent or the organic solvent, it is not necessary to lower the activity of the crosslinking agent in order to prolong the pot life of the mixture as required for the conventional adhesive composition. With this regard, in the conventional adhesive composition, it is necessary that polyglycidylamine (crosslinking agent) is dissolved in a hydrophobic organic solvent and/or a plasticizer together with an adhesion imparting agent inert to the polyglycidylamine to prepare an aqueous emulsion, so that the crosslinking function is not deteriorated by the reaction of the crosslinking agent with water or the like, and thus the polyglycidylamine is stabilized (see: Japanese Patent Publication No. 28949/1988).

The acrylic sheet of the invention is formed from the (meth)acrylic copolymer having been preliminarily adjusted to have a given molecule weight, the particles and the crosslinking agent, but an inorganic filler or an organic filler may further be used. When the inorganic or organic filler is spherical, the mean diameter thereof is usually less than 1 µm, preferably 0.02 to 0.8 µm. Examples of the inorganic fillers include oxides, such as silica, diatomaceous earth, magnesium oxide, antimony oxide, barium ferrite, strontium ferrite, barium oxide, pumice and alumina fiber; hydroxides, such as magnesium hydroxide and basic magnesium hydroxide; carbonates, such as calcium carbonate; sulfates and sulfites, such as barium sulfate, ammonium sulfate, ammonium sulfite and calcium sulfite; silicic acid salts, such as talc, clay, mica, asbestos, glass fiber, glass bead, calcium silicate, montmorillonite and bentonite; carbons, such as carbon black, graphite and carbon fiber; and other inorganic fillers, such as molybdenum sulfide, boron fiber, zinc borate, barium metaborate, calcium borate, sodium borate, silicon carbide fiber, brass fiber, single crystal potassium titanate and lead titanate zirconate.

Examples of the organic fillers include rice hull, charcoal, jute, cotton, wood flour, paper pieces, cellophane pieces, aromatic polyamide fiber, cellulose fiber, polyester fiber, polypropylene fiber, nylon fiber and various polymer fine particles. These organic fillers may be used singly or in combination. The organic filler and the inorganic filler may also be used together.

The sheet of the invention may further contains various additives, such a lubricant, colorant, stabilizer, antioxidant, ultraviolet light inhibitor, ultraviolet light absorber, antistatic agent, flame retardant and plasticizer.

In the invention, the particles, the polyfunctional compound and if necessary other components are added to the aqueous medium or the organic solvent containing the (meth)acrylic copolymer to homogeneously disperse the particles in the aqueous medium or the organic solvent. Thereafter, the resulting mixture is defoamed by a vacuum deaeration apparatus or the like to remove air bubbles which are entrained into the mixture together with the particles or by mixing the components.

Defoaming of the mixture is carried out in such a manner that the air bubble content in the mixture becomes less than 10% by volume, preferably less than 7% by volume, more preferably less than 5% by volume, based on the amount of the (meth)acrylic copolymer.

For conducting the defoaming as described above, the emulsion or the organic solvent solution is placed in a container-rotary type vacuum defoaming apparatus and defoamed for 2 to 20 minutes under reduced pressure of −600 to −760 mmHg (gauge pressure). Other than the container-rotary type vacuum defoaming apparatus, a continuous vacuum deaeration apparatus is also employable.

To reduce the amount of the air bubbles associated with the particles, a dispersion obtained by beforehand dispersing the particles in water and/or an organic solvent can be used, or a slurry or a cake obtained by filtration of and removal of water or solvent in the dispersion can be also used. The mean diameter of the air bubbles associated with the particles is in the range of one hundred µm to several hundred µm. When the air bubble content exceeds 10% by volume, the mechanical properties (tensile strength) of the sheet are deteriorated. By adjusting the air bubble content to not more than 10% by volume, the air bubbles contained in the resulting acrylic sheet do not give an adverse effect to the properties of the sheet.

The mixture prepared as above is then subjected to a coating operation according to the thickness of the resulting sheet. Generally, the mixture is applied onto a release paper or a film having been treated with a release agent by means of a thin layer coating device such as a die coater (T die). The coating thickness is usually about 0.05 to 1 mm on dry basis. If the coating thickness is larger than 0.5 mm, the organic solvent or water is hardly evaporated from the deep portion of the sheet, and in this case, air bubbles tend to be easily produced. Accordingly, for forming a sheet having a thickness of not less than 0.5 mm, it is advantageous to laminate thin sheets one upon another so as to obtain the aimed thickness. For forming a laminate of thin sheets, an acrylic adhesive is employable. If the sheets have tackiness, a laminate of the sheets can be formed without using an adhesive. Most of the sheets obtained by casting and drying the organic solvent type polymer have surface tackiness, so that a laminate of the sheets can be easily formed by a lamination method.

Depending on the kind of the (meth)acrylic copolymer and the size of the particles used, protrusions and depressions are sometimes formed on the surface of the resulting sheet in the drying procedure, even if the organic solvent type polymer is used, and such sheet does not exhibit tackiness. Such sheets having protrusions and depressions on their surfaces cannot be laminated together in many cases.

For preparing the sheet more economically, a sheet formed by casting and drying the mixture on a separator is wound up together with the separator and aged. Then, plural sheets are laminated together if needed to obtain a laminate sheet having the desired thickness. In more detail, the sheet is aged so as to accelerate or complete the crosslinked reaction of the functional group of the (meth)acrylic copolymer with the polyfunctional compound, and then the aged sheet is laminated on another sheet obtained immediately after the drying procedure.

If the sheets have pressure-sensitive adhesion properties, the sheets are arranged in such a manner that the surfaces of the sheets, which are not contacted with the separators, face each other and are laminated together to form a laminate sheet having a smooth surface and autohesion properties.

An acrylic sheet formed by the lamination method as described above has a sufficient strength against the shear stress and is free from interlaminar peeling. Accordingly, a sheet having an optional thickness can be prepared.

The viscosity of the mixture used in the coating operation is in the range of about 70 to 500 poise in the case of the emulsion polymer, and it is in the range of about 30 to 1,000 poise in the case of the organic solvent type polymer. The mixture preferably has thixotropic properties. When the viscosity of the mixture is less than 70 poise in the case of the emulsion polymer, or when it is less than 30 poise in the case of the organic solvent type polymer, a thickening agent is preferably added to adjust the viscosity. For the purpose of increasing elasticity in addition to the purposes of increasing viscosity or imparting thixotropic properties, fine particles of silica, organic fine particles, crosslinked polymer gel fine particles such as microgel, etc. may be further dispersed in the resin matrix.

The emulsion thus cast is then dried. For the drying, heating is preferably used because conventional facilities are available and it is economically advantageous. In order to raise the drying speed and the line speed and thus to improve the productivity, irradiation with infrared rays, far infrared rays, electron rays, etc. may be used in combination with heating. The crosslinking reaction in the mixture takes place at room temperature, but from an economical viewpoint, the drying is preferably carried out at a temperature of 70° to 140° C. in the case of the emulsion polymer and at a temperature of 40° to 120° C. in the case of the organic solvent type polymer. The drying time is in the range of usually 2 to 20 minutes. Particularly, the drying of the mixture is preferably conducted at a temperature lower than the boiling point of the water or the organic solvent used, with stepwise elevation in temperature.

In the acrylic sheet thus dried, the crosslinking reaction proceeds in the drying procedure or the aging procedure at room temperature, and in many cases, a crosslinked structure is formed mainly among the molecules by the polyglycidylamine that is a favorable crosslinking agent for the carboxyl group.

The acrylic sheet obtained by a single coating and drying operation has a thickness of usually 0.05 to 1 mm, preferably 0.08 to 0.8 mm, more preferably 0.08 to 0.5 mm, and air bubbles are not substantially contained in this sheet. That is, the sheet has an air bubble content of usually not more than 10% by volume, preferably not more than 7% by volume, more preferably not more than 5% by volume, particularly preferably not more than 2% by volume, most preferably not more than 1% by weight.

In the acrylic adhesive sheet of the invention, a pressure-sensitive adhesive layer is provided on at least one surface, preferably both surfaces, of the above-described acrylic sheet. The pressure sensitive adhesive used herein is selected in view of the use application of the acrylic adhesive sheet and the kind of the adherend. As the adhesives, various types such as solvent type, emulsion type and UV curing type can be employed, and they are selected in view of the adhesion performance. The pressure-sensitive adhesive layer can be formed, for example, by directly applying the pressure-sensitive adhesive onto the surface of the acrylic sheet, or by initially applying the adhesive onto other support and then transferring the adhesive onto the acrylic sheet.

The pressure-sensitive adhesive layer formed as above has a thickness of usually 30 to 100 μm.

The acrylic sheet is preferably aged before or after providing the adhesive layer. By aging the sheet, the strength of the sheet tends to be improved.

The acrylic sheet of the invention preferably can be prepared by directly using the (meth)acrylic copolymer obtained by emulsion polymerization in an aqueous medium using a reactive emulsifying agent together with the aqueous medium, or directly using the (meth)acrylic copolymer obtained by polymerization in an organic solvent together with the organic solvent; then adding thereto specific particles and a polyfunctional compound (crosslinking agent) to homogeneously disperse the particles; and deforming, casting and drying the resulting mixture. Therefore, the acrylic sheet of the invention and the acrylic adhesive sheet of the invention obtained therefrom have enhanced water resistance and mechanical strength.

The acrylic adhesive sheet can be used for bonding and fixing members of various fields, such as fields of automobiles, vehicles, ships, aircrafts, buildings, building materials, electrical appliances, audio-visual machines, displays (advertising displays) and mechanical parts, or can be used for bonding and fixing commercially available members.

EFFECT OF THE INVENTION

In the acrylic sheet of the invention, particles having a particle diameter and a specific gravity both specifically defined are dispersed in a resin matrix substantially not containing air bubbles, said resin matrix being formed from a relatively long chain (meth)acrylic copolymer prepared by emulsion polymerization in an aqueous medium or a relatively long chain (meth)acrylic copolymer prepared by solution polymerization in an organic solvent and a crosslinking agent. Therefore, the sheet shows good flexibility even at low temperatures and is well-balanced between cohesion force and elongation. Moreover, by the use of the crosslinking agent, a crosslinked structure is formed mainly among the molecules through the reaction of the crosslinking agent with the functional group of the (meth)acrylic copolymer, and the crosslinking reaction is completed at low temperatures. Therefore, there is no thermal aging of the sheet or no change in the sheet properties with time, so that the mechanical strength (tensile strength-tensile elongation, shear strength-shear strain) of the sheet can be enhanced. Further, the acrylic sheet of the invention does not substantially contain air bubbles, so that water penetration into the sheet layer is prohibited, and thus the sheet is excellent in water resistance. Furthermore, since the particles are contained in amounts of 15 to 55% by volume, the nonvolatile content in the mixture is large, so that the drying characteristics of the cast emulsion or organic solvent solution are improved, resulting in high productivity. Still further, since the acrylic sheet of the invention can be prepared using large amounts of inexpensive starting materials and conventional facilities, the costs for the starting materials can be reduced and the acrylic sheet of the invention is economically advantageous.

If particles having various functions such as conductivity, electromagnetic wave shielding properties, flame retardance, transparency and colorability are used as the particles, the acrylic sheet of the invention can be imparted with such additional functions other than the adhesion properties. That is, the sheet of the invention is prepared by forming a crosslinked structure mainly among the molecules of the (meth)acrylic copolymer preliminarily prepared by thermal drying, so that the particles to be added may be opaque particles which inhibit transmission of ultraviolet light or the like. Further, composite particles containing ingredients having the above-mentioned various functions are also employable.

By the addition of the particles, an action of relaxing the stress applied to the acrylic sheet can be remarkably improved, and the pressure-sensitive adhesive and the sheet can be favorably bonded.

The acrylic adhesive sheet obtained by forming a pressure-sensitive adhesive layer on the acrylic sheet is excellent in the shape-following properties to the adherend, and owing to the effect of the particles, the sheet is prominently improved in the stress dispersion as compared with the air bubble-containing foamed materials of the conventional type. Additionally, the sheet of the invention has resistance to peel force or shear force and is excellent in 180° peel resistance, creep resistance (holding power) and constant load peel resistance, and these excellent adhesion properties are maintained with no variation for a long period of time. For these reasons, the acrylic adhesive sheet of the invention is highly reliable in the adhesive bonding.

The acrylic sheet of the invention can be readily prepared from an aqueous emulsion or an organic solvent solution of a (meth)acrylic copolymer which can be prepared using a known polymerization apparatus.

EXAMPLES

The present invention will be further described with reference to the following examples, but it should be construed that the invention is in no way limited to those examples.

Preparation Example 1

Synthesis of sheet-forming emulsion (AF-2)

In 450 parts by weight of deionized water was dissolved 10 parts by weight of sodium polyoxyethylenelaurylsulfate to prepare an emulsifier aqueous solution. In the aqueous solution, 850 parts by weight of butyl acrylate, 110 parts by weight of butyl methacrylate, 30 parts by weight of methacrylic acid, 10 parts by weight of 2-hydroxyethyl methacrylate and 20 parts by weight of a reactive emulsifier represented by the following formula (6-30) (Adecaria Soap NE-30, available from Asahi Electro-Chemical Co., Ltd.) were dispersed with stirring, to prepare 1,480 parts by weight of a monomer aqueous dispersion.

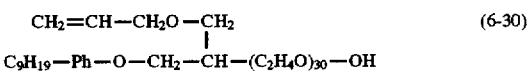

$$CH_2=CH-CH_2O-CH_2 \atop | \atop C_9H_{19}-Ph-O-CH_2-CH-(C_2H_4O)_{30}-OH \qquad (6\text{-}30)$$

Separately, to a glass reactor equipped with a stirrer, a thermometer, a dropping funnel, a nitrogen gas feeding tube and a reflux condenser was introduced 480 parts by weight of deionized water and were further added 20 parts by weight of ammonium persulfate, 20 parts by weight of butyl acrylate and 10 parts by weight of sodium dodecylbenzenesulfonate, to prepare an aqueous reaction liquid.

Then, the glass reactor was purged of air with nitrogen gas, and the aqueous reaction liquid in the reactor was heated to 82° C. to initiate the reaction.

Immediately after initiation of the reaction, to the reactor was dropwise added 1,480 parts by weight of the monomer aqueous dispersion over a period of 180 minutes through the dropping funnel to perform emulsion polymerization, while the temperature of the reaction liquid was kept at 82° C.

After 180 minutes, the reaction liquid was kept at 82° C. for further 120 minutes to complete the polymerization reaction. After cooling, to the aqueous emulsion obtained was added ammonia water to adjust the pH value to 8.5. The aqueous emulsion had a nonvolatile content of 51.8% by weight, and the emulsion polymer particles had a mean particle diameter of 0.2 μm. The viscosity measured by a B type viscometer using a rotor of No. 4 was 30 poise/25° C. (3,000 cps) at 6 rpm and 7 poise/25° C. (700 cps) at 60 rpm.

A part of the reaction liquid was drawn out, diluted with tetrahydrofuran, then filtered and subjected to GPC measurement (gel permeation chromatography, HLC 8020, available from Toyo Soda Mfg. Co., Ltd.).

From the GPC chart, a molecular weight of the acrylic acid alkyl ester copolymer was determined using a calibration curve made from a polystyrene standard molecular weight. As a result, the weight-average molecular weight of this copolymer was 680,000.

EXAMPLE 1

Preparation of transparent sheet

In a plastic container equipped with a dispersing type stirrer, 1,930 parts by weight (resin content: 51.8% by weight) of the aqueous emulsion prepared above and 10 parts by weight of a solution obtained by dissolving 5 parts by weight of N,N,N',N'-tetraglycidyl-m-xylenediamine (trade name: TETRAD-X, available from Mitsubishi Gas K.K.) as a tetra-functional epoxy compound in 45 parts by weight of toluene were mixed and stirred. Then, to the mixture were added 1,000 parts by weight of spherical crosslinked PMMA fine particles having a mean particle diameter of 20 μm and a true specific gravity of 1.19 (MR-20G, available from Soken Chemical & Engineering Co., Ltd.) with stirring, and the stirring was further continued for 30 minutes to obtain an aqueous emulsion mixture containing homogeneously dispersed the spherical crosslinked PMMA fine particles.

The mixture was fed to a container-rotary stirring type defoaming machine and was defoamed for 10 minutes at a vacuum degree of −720 mmHg.

The viscosity of the aqueous emulsion mixture thus defoamed was measured with a B type viscometer using a rotor of No. 4. As a result, the viscosity was 105 poise/25° C. at 6 rpm and 20 poise/25° C. at 60 rpm.

Then, the defoamed aqueous emulsion mixture was applied onto a release paper by means of a doctor blade of 20 mil, and was dried first at 70° C. for 5 minutes and then at 90° C. for 20 minutes.

The thickness, specific gravity and the air bubble content of the transparent acrylic sheet obtained are set forth in Table 2.

EXAMPLES 2–4

An acrylic sheet was prepared in the same manner as in Example 1 except that the amount of the aqueous emulsion, the amount of the tetra-functional crosslinking agent and the amount of the solid particles were varied as shown in Table 1. The viscosity of the aqueous emulsion mixture used for preparing the acrylic sheet is set forth in Table 1.

The thickness, specific gravity and the air bubble content of the transparent acrylic sheet obtained are set forth in Table 2.

EXAMPLES 5

Preparation of flame-retardant sheet

In a plastic container equipped with a dispersing type stirrer, 1,930 parts by weight of the aqueous emulsion prepared above and 20 parts by weight of a solution obtained by dissolving 5 parts by weight of N,N,N',N'-tetraglycidyl-m-xylenediamine (trade name: TETRAD-X, available from Mitsubishi Gas K.K.) as a tetra-functional epoxy compound in 45 parts by weight of toluene were mixed and stirred. Then, to the mixture were added 2,000 parts by weight of solid and flame-retardant fine particles of aluminum hydroxide having a mean particle diameter of 25 µm and a true specific gravity of 2.35 (C-325, available from Sumitomo Chemical Co., Ltd.) with stirring, and the stirring was further continued for 30 minutes to obtain an aqueous emulsion mixture containing homogeneously dispersed aluminum hydroxide fine particles. The mixture was fed to a container-rotary stirring type defoaming machine and was defoamed for 10 minutes at a vacuum degree of −720 mmHg.

The viscosity of the aqueous emulsion mixture thus defoamed was measured with a B type viscometer using a rotor of No. 4. As a result, the viscosity was 80 poise/25° C. at 6 rpm and 20 poise/25° C. at 60 rpm.

Then, the defoamed aqueous emulsion mixture was applied onto a release paper by means of a doctor blade of 20 mil, and was dried first at 70° C. for 5 minutes and then at 90° C. for 20 minutes. The thickness, specific gravity and the air bubble content of the sheet obtained are set forth in Table 2.

EXAMPLE 6

An acrylic sheet was prepared in the same manner as in Example 5 except that the amount of the aqueous emulsion, the amount of the tetra-functional crosslinking agent and the amount of the solid particles were varied as shown in Table 1. The viscosity of the aqueous emulsion mixture used for preparing the flame-retardant acrylic sheet is set forth in Table 1.

The thickness, specific gravity and the air bubble content of the flame-retardant acrylic sheet obtained are set forth in Table 2.

EXAMPLE 7

Preparation of acrylic adhesive sheet

To 150 parts by weight of an acrylic solvent adhesive containing 2-ethylhexyl acrylate as its major component (SK Dine 1570, available from Soken Chemical & Engineering Co., Ltd.) was added 2 parts by weight of a 45% solution of an isocyanate curing agent (Colonate L, available from Nippon Polyurethane K.K.). The resulting mixture was applied onto a release paper by means of a doctor blade of 13 mil and dried at 85° C. for 2 minutes, to obtain a pressure-sensitive adhesive layer having a thickness of 60 µm. This adhesive layer was transferred onto both surfaces of the solid particle-containing acrylic sheets prepared in Examples 1 to 6, followed by applying a pressure by moving thereon a 20 kg roller back and forth twice, to prepare a double-coated adhesive sheet.

Comparative Example 1

Preparation of sheet and preparation of double-coated adhesive sheet

An acrylic foam double-coated adhesive tape was prepared in the same manner as described above except that the pressure-sensitive adhesive layer was transferred onto both surfaces of a commercially available acrylic foam (thickness: 0.5 mm, specific gravity: 0.5) mainly made of ethyl acrylate containing air bubbles and having been subjected to urethane resin crosslinking treatment. This acrylic foam double-coated adhesive tape was used as a sample for comparison.

Measurement of properties

Each of the acrylic sheets prepared in the examples, the comparative examples and the reference example was laminated on one surface of a PET film (thickness: 50 µm) having been subjected to corona discharge treatment, and they were bonded together by moving thereon a 20 kg roller back and forth twice, followed by allowing them to stand for 24 hours in an ordinary state (23° C., 65 %RH), to prepare a sample. The sample was measured on 180° peel strength, creep resistance (holding power), 90° peel strength under constant load (ordinary state, after water immersion), and relation between shear strength and strain in the manner described below.

(a) 180° Peel strength

The sample was cut into a test specimen having a width of 25 mm. This specimen was laminated on a stainless steel plate, and they were bonded together by moving thereon a 1 kg roller back and forth three times, followed by allowing them to stand for 24 hours in an ordinary state. Then, the specimen was measured on the 180° peel strength at a pulling rate of 300 mm/min.

(b) 90° Peel strength

The sample was cut into a test specimen having a width of 25 mm. This specimen was laminated on a stainless steel plate, and they were bonded together by moving thereon a 1 kg roller back and forth three times, followed by allowing them to stand for 24 hours in an ordinary state. Then, the specimen was measured on the 90° peel strength at a pulling rate of 300 mm/min.

(c) Creep resistance

The sample was cut into a test specimen having a size of 20 mm×100 mm. This specimen was laminated on a stainless steel plate in such a manner that the laminated area was 20 mm×20 mm, and they were bonded by moving thereon a 1 kg roller back and forth twice, followed by allowing them to stand for 1 hour in an ordinary state. Then, they were placed in a dryer at 80° C. and allowed to stand for 1 hour. Thereafter, a load of a shear force of 1 kg was applied to one end of the specimen to measure a movement of the double-coated adhesive tape slipped. (d) 90° Peel strength under constant load (ordinary state and after water immersion)

The sample was cut into a test specimen having a size of 20 mm×100 mm. This specimen was laminated on a stainless steel plate in such a manner that the laminated area was 20 mm×20 mm, and they were bonded together by moving thereon a 1 kg roller back and forth twice, followed by allowing them to stand for 3 days in an ordinary state or in a constant temperature water bath at 25° C. Then, a given load was applied to one end of the double-coated adhesive sheet at right angles to the stainless steel plate, to measure a distance by which the double-coated adhesive tape is deviated from the stainless steel plate. The measurement of the water resistance was conducted by applying a given load immediately after the specimen was taken out of the water bath.

(e) Measurement of relation between shear strength and shear strain

The double-coated adhesive sheet was cut into a test specimen having a size of 10 mm×10 mm. This specimen was sandwiched between tips of two polycarbonate plates each having a width of 15 mm, a length of 50 mm and a thickness of 2 mm, and they were bonded together by applying a load of 1 kg to the contact portion for 15 minutes. Two of such specimens were prepared. One was allowed to stand in an ordinary state and measured on the relation between shear strength and shear strain in an ordinary state. The other was immersed in a constant temperature water bath at 25° C. for 24 hours, then taken out and the relation between shear strength and shear strain in an ordinary state was immediately measured. The relation between shear strength and shear strain was measured by a tensile tester at a pulling rate of 1 mm/min.

The results of the adhesion property evaluation tests (a), (b), (c) and (d) are set forth in Table 2. The result of the test (e) is shown in FIG. 1.

TABLE 1

| | Amount (Parts by weight) | | | Viscosity | |
|---|---|---|---|---|---|
| | Emulsion | Crosslinking agent | Solid particle | Poise/25° C. | |
| | | | Aluminum | | |
| | (resin) | TETRAD-X | PMMA | hydroxide | 6 rpm | 60 rpm |
| Ex. 1 | 1930(1000) | 1 | 1000 | — | 105 | 20 |
| Ex. 2 | 1930(1000) | 2 | 1000 | — | 105 | 20 |
| Ex. 3 | 1930(1000) | 4 | 1000 | — | 105 | 21 |
| Ex. 4 | 1930(1000) | 8 | 1000 | — | 140 | 29 |
| Ex. 5 | 1930(1000) | 2 | — | 2000 | 80 | 20 |
| Ex. 6 | 1930(1000) | 4 | — | 2000 | 83 | 20 |

TABLE 2

| | Acrylic sheet | | | Adhesive sheet Thickness (μm) | 180° Peel Strength kg/25 mm |
|---|---|---|---|---|---|
| | Thickness (μm) | Specific gravity | Air bubble content (% by volume) | | |
| Ex. 1 | 300 | 1.07 | 0 | 420 | 4.6 broken |
| Ex. 2 | 300 | 1.07 | 0 | 420 | 5.6 broken |
| Ex. 3 | 300 | 1.07 | 0 | 420 | 4.9 broken |
| Ex. 4 | 300 | 1.07 | 0 | 420 | 5.3 broken |
| Ex. 5 | 300 | 1.63 | 1.2 | 420 | 4.3 broken |
| Ex. 6 | 300 | 1.63 | 1.2 | 420 | 4.6 broken |
| Comp. Ex. 1 | 500 | 0.5 | 50 | 620 | 2.7 broken |

TABLE 2 (Continued)

| | Holding power | | 90° Peel strength under constant load (load: 500 g) | |
|---|---|---|---|---|
| | 40° C. 72 Hr | 80° C. 1 Hr. | Ordinary state 1 Hr | Water immersion 1 Hr |
| Ex. 1 | 0 mm | 0.5 mm | 0.5 mm | 0.5 mm |
| Ex. 2 | 0 mm | 0.1 mm | 0.5 mm | 0.5 mm |
| Ex. 3 | 0 mm | 0 mm | 0.5 mm | 0.5 mm |
| Ex. 4 | 0 mm | 0 mm | 3.0 mm | 2.0 mm |
| Ex. 5 | 0 mm | 0 mm | 2.0 mm | 2.0 mm |
| Ex. 6 | 0 mm | 0 mm | 2.5 mm | 2.5 mm |
| Comp. Ex. 1 | 0 mm | 0.4 mm | 7.5 mm | fell down |

Note:

With regard to the 180° peel strength and the 90° peel strength, the term "broken" means that the sheet layer is broken.

The air bubble content was determined from a ratio of a weight of the sheet practically measured to a weight of the sheet calculated using the amount (% by volume) of the acrylic resin in the polymer matrix, the amount (% by volume) of the solid particles therein and the true specific gravities of the acrylic resin and the particles.

Preparation Example 2

Synthesis of sheet-forming acrylic acid alkyl ester copolymer

To a reactor equipped with a stirrer, a condenser, a dropping funnel and a nitrogen gas feeding tube were introduced 320 parts by weight of toluene, 60 parts by weight of ethyl acetate, 280 parts by weight of butyl acrylate, 140 parts by weight of ethyl acrylate, 12 parts by weight of acrylic acid and 0.4 part by weight of 2-hydroxyethyl methacrylate, and the reaction system was heated up to 75° C. in a stream of nitrogen gas.

Then, to the reaction liquid was dropwise added a solution obtained by dissolving 4 parts by weight of azobisisobutylonitrile in 20 parts by weight of ethyl acetate through the dropping funnel, and the reaction liquid was kept at the same temperature for 6 hours to obtain an acrylic acid alkyl ester copolymer.

The reaction liquid had a copolymer solids content of 49.8%.

A part of the reaction liquid was drawn out, diluted with tetrahydrofuran, then filtered and subjected to GPC measurement (gel permeation chromatography, HLC 8020, available from Toyo Soda Mfg. Co., Ltd.).

From the GPC chart, a molecular weight of the acrylic acid alkyl ester copolymer was determined using a calibration curve made from a polystyrene standard molecular weight. As a result, the weight-average molecular weight of this copolymer was 270,000.

EXAMPLE 8

Preparation of transparent sheet

In a plastic container was placed 200.8 parts by weight (resin content: 100 parts by weight) of the acrylic acid alkyl ester copolymer solution obtained above, and thereto was added 21.4 parts by weight of toluene to dilute the solution so as to lower the viscosity. Thus, a toluene dilute solution having a nonvolatile content of 45% was obtained. The viscosity of the solution at 25° C. was 5,600 cps.

To the toluene dilute solution was added 4.0 parts by weight of a solution obtained by dissolving 5 parts by weight of N,N,N',N'-tetraglycidyl-m-xylenediamine (trade name: TETRAD-X, available from Mitsubishi Gas K.K.) as a tetra-functional epoxy compound in 45 parts by weight of toluene, and they were mixed and stirred.

Then, to the resulting solution were added 58 parts by weight of spherical crosslinked PMMA fine particles having a mean particle diameter of 20 μm and a true specific gravity of 1.19 (MR-20G, available from Soken Chemical & Engineering Co., Ltd.) with stirring, and the stirring was further continued for 30 minutes to obtain a solution mixture containing homogeneously dispersed spherical crosslinked PMMA fine particles.

The mixture was fed to a container-rotary stirring type defoaming machine (Borg II, available from M & K K.K.) and was defoamed for 5 minutes at a gauge pressure of −720 mmHg. The thus defoamed solution mixture had a nonvolatile content of 55.6%.

Then, the defoamed solution mixture was applied onto a release paper by means of a doctor blade of 20 mil, and was dried first at 50° C. for 10 minutes, then at 70° C. for 5 minutes and further at 75° C. for 5 minutes.

The thickness of the acrylic sheet obtained was 380 μm, the sheet surface was tacky, and no air bubble is contained in the sheet.

The properties (tensile strength, tensile elongation) of the acrylic sheet and the thickness thereof are set forth in Table 3.

EXAMPLE 9

Preparation of hollow particle-containing sheet

An acrylic sheet was prepared in the same manner as in Example 8 except that 40 parts by weight of ceramic hollow particles (trade name: Microcells SL-75A, available from Chichibu Onoda K.K.) were used in place of 58 parts by weight of the PMMA crosslinked particles. The ceramic particles had a mean particle diameter of 40 μm and a true specific gravity of 0.7.

The properties (tensile strength, tensile elongation) of the acrylic sheet and the thickness thereof are set forth in Table 3.

EXAMPLE 10

Preparation of acrylic adhesive sheet 150 parts by weight of an acrylic solvent adhesive containing butyl acrylate as its major component (SK Dine 1386, available from Soken Chemical & Engineering Co., Ltd.) was mixed with 2.75 parts by weight of a 45% solution of an isocyanate curing agent (Colonate L, available from Nippon Polyurethane K.K.).

The resulting mixture was applied onto a release paper by means of a doctor blade of 11 mil and dried at 85° C. for 2 minutes, to obtain a pressure-sensitive adhesive layer having a thickness of 60 μm.

The adhesive layers thus obtained were transferred onto both surfaces of the acrylic sheets prepared in Examples 1 and 2, followed by applying pressure by moving thereon a 20 kg roller back and forth twice, to obtain a double-coated acrylic adhesive sheet.

The peel strength, holding power and the 90° peel strength under constant load of the double-coated acrylic adhesive sheet to evaluate the adhesion properties.

The results are set forth in Table 3. The result of the water resistance test is set forth in Table 4.

TABLE 3

Tensile Properties of Acrylic Sheet

| | Aging condition | Thickness (μm) | Tensile strength Breaking strength (kg/cm²) | Elongation at break (%) |
|---|---|---|---|---|
| Ex. 8 | 40° C. × 2 days | 380 | 3.9 | 660 |
| Ex. 9 | 40° C. × 2 days | 280 | 5.0 | 630 |

Reference Example 1

In a plastic container equipped with a dispersing type stirrer, 1,930 parts by weight of the sheet-forming aqueous emulsion AF-2 prepared in Preparation Example 1 and 20 parts by weight of a solution obtained by dissolving 5 parts by weight of N,N,N',N'-tetraglycidyl-m-xylenediamine (trade name: TETRAD-X, available from Mitsubishi Gas K.K.) as a tetra-functional epoxy compound in 45 parts by weight of toluene were mixed and stirred. Then, to the mixture were added 500 parts by weight of ceramic hollow particles having a mean particle diameter of 40 μm and a true specific gravity of 0.7 (trade name: Microcells SL-75A, available from Chichibu Onoda K.K.) with stirring, and the stirring was further continued for 30 minutes to obtain an aqueous emulsion mixture containing homogeneously dispersed ceramic hollow particles.

The mixture was fed to a container-rotary stirring type defoaming machine and was defoamed for 10 minutes at a vacuum degree of −720 mmHg.

The viscosity of the aqueous emulsion mixture thus defoamed was measured with a B type viscometer using a rotor of No. 4. As a result, the viscosity was 116 poise/25° C. (11,600 cps) at 6 rpm and 22 poise/25° C. (2,200 cps) at 60 rpm.

Then, the defoamed aqueous emulsion mixture was applied onto a release paper by means of a doctor blade of 20 mil, and was dried first at 70° C. for 5 minutes and then at 90° C. for 20 minutes.

150 parts by weight of an acrylic solvent adhesive containing butyl acrylate as its major component (SK Dine 1386, available from Soken Chemical & Engineering Co., Ltd.) was mixed with 2.75 parts by weight of a 45% solution of an isocyanate curing agent (Colonate L, available from Nippon Polyurethane K.K.). The resulting mixture was applied onto a release paper by means of a doctor blade of 11 mil and dried at 85° C. for 2 minutes, to obtain a pressure-sensitive adhesive layer having a thickness of 60 μm. The adhesive layers were transferred onto both surfaces of the ceramic hollow particle-containing acrylic sheet prepared above, followed by applying pressure by moving thereon a 20 kg roller back and forth twice, to prepare a double-coated adhesive sheet. The adhesion properties of this sheet were compared with those of the double-coated adhesive sheet prepared in Example 10, and the results are set forth in Table 4.

The properties of the sheet were measured in accordance with the aforementioned methods.

Separately, the adhesive layers prepared above were transferred onto both surfaces of the acrylic sheets prepared in Examples 8 and 9, followed by applying pressure by moving thereon a 20 kg roller back and forth twice, to prepare double-coated adhesive sheets.

TABLE 4

Adhesion Properties of Acrylic Adhesive Sheet

|  | Example 10 | Reference Example 1 |
|---|---|---|
| 90° Peel strength (kg/20 mm) | | |
| after 20 minutes | 2.7 mm | 3.0 mm |
| after 1 day | 6.5 mm> (rupture of substrate) | 4.3 mm |
| Holding power | | |
| 60° C. (1 kg × 7 days) | 1.2 mm | 1.5 mm |
| 135° C. (1 kg × 1 hr) | 1.7 mm | 1.8 mm |
| 90° Peel strength under constant load | | |
| Ordinary state (500 g × 7 days) | 1.3 mm | 14.0 mm |
| 80° C. (300 g × 1 hr) | 0.4 mm | 1.6 mm |
| water immersion, 7 days (1 kg × 1 hr) | 2.8 mm | — |

EXAMPLE 11

On both surfaces of the double-coated acrylic sheet prepared in example 10, polyethylene terephthalate (PET) films (thickness: 50 µm) having been subjected to corona discharge treatment were laminated, and they were bonded together by moving thereon a 20 kg roller back and forth twice, followed by allowing them to stand for 1 day in an ordinary state, to prepare a sample.

The sample was cut into a test specimen having a size of 20 mm×50 mm, and this test specimen was weighed.

Then, the specimen was immersed in a constant temperature water bath at 23° C. and 60° C. for a given period of time and then taken out. The water on the PET film was wiped out and immediately weighed. From a difference in the weight of the specimen between before and after the immersion, a weight of the water content and a proportion of the water content were determined.

For reference, after a double-coated acrylic adhesive sheet prepared in the same manner as above using an emulsion polymer was immersed in water at 60° C. for 7 days, the proportion of the water content was measured with a result of 6.72%, and it was confirmed that the double-coated acrylic adhesive sheet prepared using the organic solvent was better than the sheet of emulsion polymer type in water resistance.

TABLE 5

Change in Water Content of Double-Coated Adhesive Sheet

| | Immersing Condition | After 20 minutes Weight of water-content | After 1 day Weight of water-content | Proportion of water-content | After 7 days Weight of water-content | Proportion of water-content |
|---|---|---|---|---|---|---|
| Ex. 11 | 23° C. | 0.3170 g | 0.3189 g | 0.61% | 0.3208 g | 1.20% |
| | 60° C. | 0.3142 g | 0.3199 g | 1.62% | 0.3255 g | 3.40% |

EXAMPLES 12–14

Synthesis of sheet-forming emulsion (AF-1)

In 420 parts by weight of deionized water was dissolved 10 parts by weight of sodium polyoxyethylenelaurylsulfate to prepare an emulsifier aqueous solution. In the aqueous solution, 650 parts by weight of 2-ethylhexyl acrylate, 310 parts by weight of butyl methacrylate, 30 parts by weight of methacrylic acid, 10 parts by weight of acrylonitrile and 20 parts by weight of a reactive emulsifier represented by the following formula (6-30) (Adecaria Soap NE-30, available from Asahi Electro-Chemical Co., Ltd.) were dispersed with stirring, to prepare 1,480 parts by weight of a monomer aqueous dispersion.

(6-30)

Separately, to a glass reactor equipped with a stirrer, a thermometer, a dropping funnel, a nitrogen gas feeding tube and a reflux condenser was introduced 480 parts by weight of deionized water and were further added 20 parts by weight of ammonium persulfate, 20 parts by weight of butyl acrylate and 10 parts by weight of sodium dodecylbenzenesulfonate, to prepare an aqueous reaction liquid.

Then, the glass reactor was purged of air with nitrogen gas, and the aqueous reaction liquid in the reactor was heated to 82° C. to initiate the reaction.

Immediately after initiation of the reaction, to the reactor was dropwise added 1,450 parts by weight of the monomer aqueous dispersion over a period of 180 minutes through the dropping funnel to perform emulsion polymerization, while the temperature of the reaction liquid was kept at 82° C.

After 180 minutes, the reaction liquid was kept at 82° C. for 120 minutes to complete the polymerization reaction. After cooling, to the aqueous emulsion obtained was added ammonia water to adjust the pH value to 8.5. The aqueous emulsion had a nonvolatile content of 52.5% by weight, and the emulsion polymer particles had a mean particle diameter of 0.15 µm. The viscosity measured by a B type viscometer using a rotor of No. 4 was 210 poise/25° C. (21,000 cps) at 6 rpm and 60 poise/25° C. (6,000 cps) at 60 rpm.

This aqueous emulsion was developed on a nonwoven fabric and dried to prepare a sheet.

Preparation of sheet using ceramic particles

In a plastic container equipped with a dispersing type stirrer, 1,930 parts by weight (resin content: 52.5% by weight) of the aqueous emulsion AF-1 and a solution obtained by dissolving 5 parts by weight of N,N',N''- tetraglycidyl-m-xylenediamine (trade name: TETRAD-X, available from Mitsubishi Gas K.K.) as a tetra-functional epoxy compound in 45 parts by weight of toluene were mixed and stirred. The amount of the solution used herein was that shown in Table 1 (i.e., Example 12: 10 parts by weight (1 part by weight in terms of the compound); Example 13: 20 parts by weight (2 parts by weight in terms of the compound); Example 14: 40 parts by weight (4 parts by weight in terms of the compound)). Then, to the mixture were added 330 parts by weight of ceramic hollow particles having a mean particle diameter of 40 µm and a true specific gravity of 0.7 (SL-75, available from Chichibu Onoda K.K.) with stirring, and the stirring was further continued for 30 minutes to obtain an aqueous emulsion mixture containing homogeneously dispersed ceramic hollow particles.

The mixture was fed to a vacuum deaeration apparatus equipped with a rotary disc and was defoamed under the conditions of a rotation number of 1,800 rpm, a vacuum degree of −660 to −700 mmHg and a feed rate of 500 g/min.

The viscosity of the aqueous emulsion mixture thus defoamed was measured with a B type viscometer using a rotor of No. 4. The result is set forth in Table 6.

Then, the defoamed aqueous emulsion mixture was applied onto a release paper by means of a doctor blade of 20 mil, and was dried first at 70° C. for 5 minutes and then at 90° C. for 20 minutes.

The thickness, specific gravity and the air bubble content (% by weight) of the sheet obtained are set forth in Table 6.
Preparation of acrylic adhesive sheet 150 parts by weight of an acrylic solvent adhesive containing 2-ethylhexyl acrylate as its major component (SK Dine 1570, available from Soken Chemical & Engineering Co., Ltd.) was mixed with 2 parts by weight of a 45% solution of an isocyanate curing agent (Colonate L, available from Nippon Polyurethane K.K.). The resulting mixture was applied onto a release paper by means of a doctor blade of 13 mil and dried at 85° C. for 2 minutes, to obtain a pressure-sensitive adhesive layer having a thickness of 60 µm. The adhesive layers thus obtained were transferred onto both surfaces of the ceramic hollow particle-containing acrylic sheet prepared above, followed by applying pressure by moving thereon a 20 kg roller back and forth twice, to obtain a double-coated adhesive sheet.

The 180° peel strength, holding power and the 90° peel strength under constant load of the double-coated adhesive sheet was measured to evaluate the adhesion properties.

The results are set forth in Table 7.

Comparative Example 2

A sheet was prepared in the same manner as in Example 12 except that the N,N,N',N'-tetraglycidyl-m-xylenediamine (tetra-functional epoxy compound) was not used.

The viscosity of the defoamed aqueous emulsion is set forth in Table 6. The thickness, specific gravity and the air bubble content of the sheet obtained are set forth in Table 7.
Preparation of acrylic adhesive sheet Onto the sheet obtained above was transferred the pressure-sensitive adhesive layer in the same manner as in Example 12, to prepare a double-coated adhesive sheet.

The double-coated adhesive sheet was measured on the 180° peel strength, holding power and the 90° peel strength under constant load to evaluate the adhesion properties.

The results are set forth in Table 7.

EXAMPLE 15-19
Synthesis of sheet-forming emulsion (AF-2)

In 450 parts by weight of deionized water was dissolved 10 parts by weight of sodium polyoxyethylenelaurylsulfate to prepare an emulsifier aqueous solution. In the aqueous solution, 850 parts by weight of butyl acrylate, 110 parts by weight of butyl methacrylate, 30 parts by weight of methacrylic acid, 10 parts by weight of 2-hydroxyethyl methacrylate and 20 parts by weight of a reactive emulsifier represented by the following formula (6-30) (Adecaria Soap NE-30, available from Asahi Electro-Chemical Co., Ltd.) were dispersed with stirring, to prepare 1,480 parts by weight of a monomer aqueous dispersion.

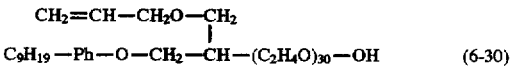
(6-30)

Separately, to a glass reactor equipped with a stirrer, a thermometer, a dropping funnel, a nitrogen gas feeding tube and a reflux condenser was introduced 480 parts by weight of deionized water and were further added 20 parts by weight of ammonium persulfate, 20 parts by weight of butyl acrylate and 10 parts by weight of sodium dodecylbenzenesulfonate, to prepare an aqueous reaction liquid.

Then, the glass reactor was purged of air with nitrogen gas, and the aqueous reaction liquid in the reactor was heated to 82° C. to initiate the reaction.

Immediately after initiation of the reaction, to the reactor was dropwise added 1,480 parts by weight of the monomer aqueous dispersion over a period of 180 minutes through the dropping funnel to perform emulsion polymerization, while the temperature of the reaction liquid was kept at 82° C.

After 180 minutes, the reaction liquid was kept at 82° C. for 120 minutes to complete the polymerization reaction. After cooling, to the aqueous emulsion obtained was added ammonia water to adjust the pH value to 8.5. The aqueous emulsion had a nonvolatile content of 51.8% by weight, and the emulsion polymer particles had a mean particle diameter of 0.2 µm. The viscosity measured by a B type viscometer using a rotor of No. 4 was 30 poise/25° C. (3,000 cps) at 6 rpm and 7 poise/25° C. (700 cps) at 60 rpm.

The weight-average molecular weight of the acrylic copolymer measured in the same manner as described above was 680,000.
Preparation of sheet using Shirasu balloons In a plastic container equipped with a dispersing type stirrer, 1,930 parts by weight (resin content: 51.8% by weight) of the aqueous emulsion AF-2 and 20 parts by weight (2 parts by weight in terms of the compound) of a solution obtained by dissolving 5 parts by weight of N,N,N',N'-tetraglycidyl-m-xylenediamine (trade name: TETRAD-X, available from Mitsubishi Gas K.K.) as a tetra-functional epoxy compound in 45 parts by weight of toluene were mixed and stirred. Then, with stirring, to the mixture were added Shirasu balloons having a mean particle diameter of 40 µm and having a number of fine pores on the surfaces (trade name: Teraballoon, available from Kaiseed K.K.) in the amounts shown in Table 6 (i.e., Example 15: 240 parts by weight, Example 16: 320 parts by weight, Example 17: 400 parts by weight, Example 18: 475 parts by weight, Example 19: 500 parts by weight). The stirring was further continued for 30 minutes to obtain an aqueous emulsion mixture containing homogeneously dispersed Shirasu balloons.

The mixture was fed to a vacuum deaeration apparatus equipped with a rotary disc and was defoamed under the conditions of a rotation number of 1,800 rpm, a vacuum degree of −660 to −700 mmHg and a feed rate of 500 g/min.

The viscosity of the aqueous emulsion mixture thus defoamed was measured with a B type viscometer using a rotor of No. 4. The viscosities at 6 rpm and at 60 rpm are set forth in Table 6.

Then, the defoamed aqueous emulsion mixture was applied onto a release paper by means of a doctor blade of 20 mil, and was dried first at 70° C. for 5 minutes and then at 90° C. for 20 minutes.

The thickness, specific gravity and the air bubble content of the sheet obtained are set forth in Table 7.
Preparation of acrylic adhesive sheet Onto the sheet obtained above were transferred the pressure-sensitive adhesive layers in the same manner as in Example 12, to prepare a double-coated adhesive sheet.

The double-coated adhesive sheet was measured on the 180° peel strength, holding power and the 90° peel strength under constant load to evaluate the adhesion properties.

The results are set forth in Table 7.

EXAMPLE 20

A sheet was prepared in the same manner as in Example 19 except that the ceramic hollow particles used in Example 12 were used in place of the Shirasu balloons.

The viscosity of the defoamed aqueous emulsion is set forth in Table 6. The thickness, specific gravity and the air bubble content of the sheet obtained are set forth in Table 7.

Preparation of acrylic adhesive sheet

Onto the sheet obtained above were transferred the pressure-sensitive adhesive layers in the same manner as in Example 12, to prepare a double-coated adhesive sheet.

The double-coated adhesive sheet was measured on the 180° peel strength, holding power and the 90° peel strength under constant load to evaluate the adhesion properties.

The results are set forth in Table 7.

EXAMPLE 21

A sheet was prepared in the same manner as in Example 20 except that the ceramic hollow particles were used in the amount shown in Table 6 (670 parts by weight).

The viscosity of the defoamed aqueous emulsion is set forth in Table 6. The thickness, specific gravity and the air bubble content of the sheet obtained are set forth in Table 7.

Preparation of acrylic adhesive sheet

Onto the sheet obtained above were transferred the pressure-sensitive adhesive layers in the same manner as in Example 12, to prepare a double-coated adhesive sheet.

The double-coated adhesive sheet was measured on the 180° peel strength, holding power and the 90° peel strength under constant load to evaluate the adhesion properties.

The results are set forth in Table 7.

EXAMPLES 22–25

Synthesis of sheet-forming emulsions (AF-3–AF-5)

In 420 parts by weight of deionized water was dissolved 10 parts by weight of sodium polyoxyethylenelaurylsulfate to prepare an emulsifier aqueous solution. In the aqueous solution, monomers in the amounts (part(s) by weight) shown in Table 1 and 20 parts by weight of a reactive emulsifier represented by the following formula (6-30) (Adecaria Soap NE-30, available from Asahi Electro-Chemical Co., Ltd.) were dispersed with stirring, to prepare 1,480 parts by weight of a monomer aqueous dispersion.

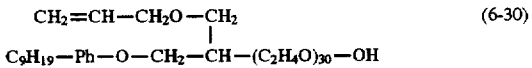

(6-30)

Separately, to a glass reactor equipped with a stirrer, a thermometer, a dropping funnel, a nitrogen gas feeding tube and a reflux condenser was introduced 480 parts by weight of deionized water and were further added 20 parts by weight of azobiscyanovalerianic acid (ammonia neutralized product), 20 parts by weight of butyl acrylate and 10 parts by weight of sodium dodecylbenzenesulfonate, to prepare an aqueous reaction liquid.

Then, the glass reactor was purged of air with nitrogen gas, and the aqueous reaction liquid in the reactor was heated to 82° C. to initiate the reaction.

Immediately after initiation of the reaction, to the reactor was dropwise added 1,480 parts by weight of the monomer aqueous dispersion over a period of 180 minutes through the dropping funnel to perform emulsion polymerization, while the temperature of the reaction liquid was kept at 82° C.

After 180 minutes, the reaction liquid was kept at 82° C. for 120 minutes to complete the polymerization reaction. After cooling, to the aqueous emulsion obtained was added ammonia water to adjust the pH value to 8.5.

The nonvolatile contents of the aqueous emulsions AF-3, AF-4 and AF-5 were 53.2%, 53.2% and 53.4%, respectively, and the mean particle diameter of these emulsions was 0.18 μm.

The viscosities of the aqueous emulsions AF-3, AF-4 and AF-5 measured by a B type viscometer were 182 poise/25° C., 225 poise/25° C. and 215 poise/25° C., respectively.

The weight-average molecular-weights of the aqueous emulsions AF-3, AF-4 and AF-5 measured in the same manner as described above were 580,000, 460,000 and 520,000, respectively.

Each of these aqueous emulsions was developed on a nonwoven fabric and dried to prepare a sheet.

Preparation of sheet using ceramic hollow particles

In a plastic container equipped with a dispersing type stirrer, the aqueous emulsion prepared above (Example 22: 1,930 parts by weight of AF-2, Example 23: 1,880 parts by weight of AF-3, Example 24: 1,880 parts by weight of AF-4, Example 25: 1,870 parts by weight of AF-5) and a solution obtained by dissolving 5 parts by weight of N,N,N',N'-tetraglycidyl-m-xylenediamine (trade name: TETRAD-X, available from Mitsubishi Gas K.K.) as a tetra-functional epoxy compound in 45 parts by weight of toluene were mixed and stirred. The amount of the solution used herein was that shown in Table 6 (i.e., Example 22: 20 parts by weight (2 parts by weight in terms of the compound); Example 23–25: 10 parts by weight (1 part by weight in terms of the compound)). Then, the mixture was fed to a container-rotary stirring type defoaming machine. To the mixture were added 500 parts by weight of ceramic hollow particles having a mean particle diameter of 40 μm and a true specific gravity of 0.7 (SL-75, available from Chichibu Onoda K.K.), and they were stirred to give a homogeneous mixture, followed by defoaming for 10 minutes at a vacuum degree of −720 mmHg. The viscosity of the aqueous emulsion mixture thus defoamed was measured with a B type viscometer using a rotor of No. 4. The result is set forth in Table 6.

Then, the defoamed aqueous emulsion mixture was applied onto a release paper by means of a doctor blade of 20 mil, and was dried first at 70° C. for 5 minutes and then at 90° C. for 20 minutes.

The thickness, specific gravity and the air bubble content of the sheet obtained are set forth in Table 7.

Preparation of acrylic adhesive sheet

To 150 parts by weight of an acrylic solvent adhesive containing 2-ethylhexyl acrylate as its major component (SK Dine 1386, available from Soken Chemical & Engineering Co., Ltd.) was added 2.5 parts by weight of a 45% solution of an isocyanate curing agent (Colonate L, available from Nippon Polyurethane K.K.). The resulting mixture was applied onto a release paper by means of a doctor blade of 11 mil and dried at 85° C. for 2 minutes, to obtain a pressure-sensitive adhesive layer having a thickness of 60 μm.

The adhesive layers were transferred onto both surfaces of the hollow particle-containing acrylic sheets prepared in Examples 11 to 14, followed by applying pressure by moving thereon a 20 kg roller back and forth twice, to prepare double-coated adhesive sheets.

The 180° peel strength, holding power and the 90° peel strength under constant load of the double-coated adhesive sheet was measured to evaluate the adhesion properties.

The results are set forth in Table 7.

Comparative Example 3

An acrylic foam double-coated adhesive tape was prepared in the same manner as described above except that the pressure-sensitive adhesive layers (layer of SK Dine 1570) were transferred onto both surfaces of a commercially available acrylic foam film (thickness: 0.5 mm, specific gravity: 0.5) mainly made of ethyl acrylate containing air bubbles and having been subjected to urethane resin crosslinking treatment. This acrylic foam double-coated adhesive tape was used as a sample for comparison.

The tapes prepared in the above examples and comparative example were measured on the relation between shear strength and shear strain in the same manner as described above. The results are set forth in FIG. 2.

TABLE 6

| | | | Emulsion Composition of emulsion | | | | | | |
|---|---|---|---|---|---|---|---|---|---|
| | 2EHA | BA | AN | MMA | EMA | BMA | MAA | HEMA | No. |
| Comp | | | | | | | | | |
| Ex. 2 | 650 | 0 | 10 | 0 | 0 | 310 | 30 | 0 | AF-1 |
| Ex. 12 | 650 | 0 | 10 | 0 | 0 | 310 | 30 | 0 | AF-1 |
| Ex. 13 | 650 | 0 | 10 | 0 | 0 | 310 | 30 | 0 | AF-1 |
| Ex. 14 | 650 | 0 | 10 | 0 | 0 | 310 | 30 | 0 | AF-1 |
| Ex. 15 | 0 | 850 | 0 | 0 | 0 | 110 | 30 | 10 | AF-2 |
| Ex. 16 | 0 | 850 | 0 | 0 | 0 | 110 | 30 | 10 | AF-2 |
| Ex. 17 | 0 | 850 | 0 | 0 | 0 | 110 | 30 | 10 | AF-2 |
| Ex. 18 | 0 | 850 | 0 | 0 | 0 | 110 | 30 | 10 | AF-2 |
| Ex. 19 | 0 | 850 | 0 | 0 | 0 | 110 | 30 | 10 | AF-2 |
| Ex. 20 | 0 | 850 | 0 | 0 | 0 | 110 | 30 | 10 | AF-2 |
| Ex. 21 | 0 | 850 | 0 | 0 | 0 | 110 | 30 | 10 | AF-2 |
| Ex. 22 | 0 | 850 | 0 | 0 | 0 | 110 | 30 | 10 | AF-2 |
| Ex. 23 | 0 | 650 | 0 | 0 | 0 | 310 | 30 | 10 | AF-3 |
| Ex. 24 | 0 | 650 | 0 | 0 | 310 | 0 | 30 | 10 | AF-4 |
| Ex. 25 | 0 | 650 | 0 | 310 | 0 | 0 | 30 | 10 | AF-5 |

TABLE 6-continued

| | Amount (part (s) by weight) | | | | Viscosity (Poise/25° C.) | |
|---|---|---|---|---|---|---|
| | Emulsion | Crosslinking agent solution TETRADE-X | Hollow particle Shirasu baloon | Ceramic | 6 rpm | 60 rpm |
| Comp | | | | | | |
| Ex. 2 | 1905 (1000) | 0(0) | 0 | 330 | 235 | 65 |
| Ex. 12 | 1905 (1000) | 10(1) | 0 | 330 | 210 | 62 |
| Ex. 13 | 1905 (1000) | 20(2) | 0 | 330 | 205 | 59 |
| Ex. 14 | 1905 (1000) | 40(4) | 0 | 330 | 240 | 65 |
| Ex. 15 | 1930 (1000) | 20(2) | 240 | 0 | 130 | 26 |
| Ex. 16 | 1930 (1000) | 20(2) | 320 | 0 | 370 | 68 |
| Ex. 17 | 1930 (1000) | 20(2) | 400 | 0 | 330 | 65 |
| Ex. 18 | 1930 (1000) | 20(2) | 475 | 0 | 615 | >100 |
| Ex. 19 | 1930 (1000) | 20(2) | 500 | 0 | >1000 | >100 |
| Ex. 20 | 1930 (1000) | 20(2) | 0 | 500 | 116 | 22 |
| Ex. 21 | 1930 (1000) | 20(2) | 0 | 670 | 125 | 27 |
| Ex. 22 | 1930 (1000) | 20(2) | 0 | 500 | 100 | 19 |
| Ex. 23 | 1980 (1000) | 10(1) | 0 | 500 | 198 | 45 |
| Ex. 24 | 1880 (1000) | 10(1) | 0 | 500 | 235 | 50 |
| Ex. 25 | 1870 (1000) | 10(1) | 0 | 500 | 220 | 40 |

Note:
With regard to the amount of emulsion, each value in parentheses means an amount of the resin.
With regard to the amount of crosslinking agent solution, each value in parentheses means an amount of the tetrafunctional epoxy compound added.

TABLE 7

| | Acrylic sheet | | | Adhesive sheet | 180° C. Peel | Holding power | | 90° C. Peel strength under constant load (load: 500 g) | | |
|---|---|---|---|---|---|---|---|---|---|---|
| | Thickness (µm) | Specific gravity | Air bubble content (% by volume) | Thickness (µm) | Strength kg/25 mm | 40° C. 72 Hr | 80° C. 1 Hr | ordinary state 1 Hr | Water immersion (72 Hr) 1 Hr | SK Dine |
| Comp | | | | | | | | | | |
| Ex. 2 | 320 | 0.83 | 7.7 | 440 | 1.2–2.8 Br. | Fell down | Fell down | Fell down | Fell down | 1570 |
| Ex. 12 | 320 | 0.84 | 6.4 | 440 | 2.8–4.2 Br. | 4.5 mm | 0.2 mm | 0.5 mm | 0.5 mm | 1570 |
| Ex. 13 | 320 | 0.84 | 6.4 | 440 | 2.8–4.6 Br. | 1.5 mm | 0.5 mm | 0.5 mm | 0.5 mm | 1570 |
| Ex. 14 | 320 | 0.83 | 7.7 | 440 | 1.6–2.4 Br. | 2.0 mm | 0.1 mm | 0.5 mm | 0.5 mm | 1570 |
| Ex. 15 | 320 | 0.90 | 4.4 | 440 | 2.4–3.2 Br. | 0 mm | 0.5 mm | 5.5 mm | 1.0 mm | 1570 |
| Ex. 16 | 310 | 0.88 | 5.7 | 430 | 2.6–3.4 Br. | 0 mm | 0 mm | 1.5 mm | 2.0 mm | 1570 |
| Ex. 17 | 320 | 0.86 | 6.2 | 440 | 2.4–3.4 Br. | 0 mm | 0 mm | 3.0 mm | 2.0 mm | 1570 |
| Ex. 18 | 320 | 0.85 | 5.7 | 440 | 2.6–4.6 Br. | 0 mm | 0 mm | 2.5 mm | 1.0 mm | 1570 |
| Ex. 19 | 320 | 0.84 | 6.4 | 440 | 4.0 Broken | 0 mm | 0 mm | 3.0 mm | 2.0 mm | 1570 |
| Ex. 20 | 320 | 0.85 | 5.2 | 440 | 2.5–3.0 Br. | 0 mm | 0 mm | 3.0 mm | 2.0 mm | 1570 |
| Ex. 21 | 330 | 0.82 | 6.1 | 450 | 2.5–3.6 Br. | 2.0 mm | 0 mm | 3.0 mm | 2.5 mm | 1570 |
| Ex. 22 | 320 | 0.90 | 0 | 440 | 4.5 Peeled | 0.1 mm | 0.9 mm | 0 mm | 0.5 mm | 1386 |
| Ex. 23 | 310 | 0.90 | 0 | 430 | 4.7 Peeled | 0.1 mm | 0.5 mm | 0 mm | 0.5 mm | 1386 |
| Ex. 24 | 310 | 0.90 | 0 | 430 | 4.6 Peeled | 0.1 mm | 0.5 mm | 0 mm | 0.5 mm | 1386 |
| Ex. 25 | 310 | 0.90 | 0 | 430 | 4.3 Peeled | 0.1 mm | 0.5 mm | 0 mm | 0.5 mm | 1386 |

Note:

With regard to the 180° peel strength, the term "broken" or "Br." means that the sheet layer is broken, and the term "peeled" means that the sheet is peeled on the interface between the sheet and the stainless steel.

The air bubble content was determined from a ratio of a weight of the sheet practically measured to a weight of the sheet calculated using the amount (% by volume) of the acrylic resin in the polymer matrix, the amount (% by volume) of the solid particles therein and the true specific gravities of the acrylic resin and the particles.

What is claimed is:

1. An acrylic sheet containing particles homogeneously dispersed in a resin matrix which does not substantially contain air bubbles and has an air bubble content of not more than 10% by volume, comprising:

a resin matrix for constituting the acrylic sheet which includes a crosslinked (meth)acrylic copolymer obtained by forming a crosslinked structure among the molecules of a (meth)acrylic copolymer, which is a copolymer of 0.1–15% by weight of a polymerizable monomer having a functional group, 60–99.9% by weight of a (meth)acrylic acid alkyl ester and 0–39.9% by weight of other monomer and has a weight-average molecular weight of 150,000 to 1,200,000, by means of a polyfunctional compound having reactivity to the functional group of the polymerizable monomer for preparing the (meth)acrylic copolymer; and particles dispersed in the resin matrix formed from the crosslinked (meth)acrylic copolymer having a mean particle diameter of 1 to 100 μm and a true specific gravity of 0.2 to 3.0.

2. The acrylic sheet as claimed in claim 1, wherein the polymerizable monomer having a functional group is an α,β-unsaturated carboxylic acid.

3. The acrylic sheet as claimed in claim 1, wherein the polyfunctional compound having reactivity to the functional group is at least one compound selected from the group consisting of polyglycidylamine, metallic chelate compounds and polyisocyanate.

4. The acrylic sheet as claimed in claim 3, wherein the crosslinked structure formed among the molecules of the (meth)acrylic copolymer is a crosslinked structure having been formed by 0.001–1.0 part by weight of a polyfunctional compound having reactivity to the functional group, based on 100 parts by weight of the (meth)acrylic copolymer.

5. The acrylic sheet as claimed in claim 1, wherein the polyfunctional compound having reactivity to the functional group is polyglycidylamine.

6. The acrylic sheet as claimed in claim 5, wherein the crosslinked structure formed among the molecules of the (meth)acrylic copolymer is a crosslinked structure having been formed by 0.001–1.0 part by weight of a polyfunctional compound having reactivity to the functional group, based on 100 parts by weight of the (meth)acrylic copolymer.

7. The acrylic sheet as claimed in claim 1, wherein the crosslinked structure formed among the molecules of the (meth)acrylic copolymer is a crosslinked structure having been formed by 0.001–1.0 part by weight of a polyfunctional compound having reactivity to the functional group, based on 100 parts by weight of the (meth)acrylic copolymer.

8. The acrylic sheet as claimed in claim 1, wherein the particles dispersed in the resin matrix are at least one kind of particles selected from the group consisting of solid particles, porous particles and hollow particles.

9. The acrylic sheet as claimed in claim 8, wherein the particles are contained in amounts of 15 to 55% by volume based on the amount of the crosslinked (meth)acrylic copolymer for forming the matrix.

10. The acrylic sheet as claimed in claim 1 wherein the particles are contained in amounts of 15 to 55% by volume based on the amount of the crosslinked (meth)acrylic copolymer for forming the matrix.

* * * * *

UNITED STATES PATENT AND TRADEMARK OFFICE
CERTIFICATE OF CORRECTION

PATENT NO. : 5,753,362  
DATED : May 19, 1998  
INVENTOR(S) : Susumu Kawase et al.

It is certified that error appears in the above-identified patent and that said Letters Patent is hereby corrected as shown below:

Column 3 Line 23 "low-molecular weight" should read --low molecular weight--.

Column 4 Line 8 "low-molecular weight" should read --low molecular weight--.

Column 5 Line 57 "Japanese patent laid-open publication no." should read --Japanese Patent Laid-Open Publication No.--.

Column 6 Line 13 "tens percent" should read --tens of percent--.

Column 10 Line 29 "large stress" should read --high stress--.

Column 12 Line 20 "a N-alkylol" should read --an N-alkylol--.

Column 13 Line 24 after "such as" delete --an--.

Column 13 Line 63 after "described" delete hyphen.

Column 15 Line 52 "having more" should read --having a more--.

Column 16 Line 34 "group" should read --groups--.

Column 18 Line 22 "change" should read --changes--.

Column 18 Line 23 "change" should read --changes--.

Column 21 Line 42 after "shear strength" delete "to the" and insert --at--.

Column 21 Line 50 after "shear strength" delete "to the" and insert --at--.

UNITED STATES PATENT AND TRADEMARK OFFICE
CERTIFICATE OF CORRECTION

PATENT NO. : 5,753,362
DATED : May 19, 1998
INVENTOR(S) : Susumu Kawase et al.

It is certified that error appears in the above-identified patent and that said Letters Patent is hereby corrected as shown below:

Column 21 Line 54 after "tensile strength" delete "to the" and insert --at--.

Column 22 Line 4 after "shear strength" delete "to the" and insert --at--.

Column 23 Line 64 "molecule" should read --molecular--.

Column 24 Line 24 "such a" should read --such as a--.

Column 26 Line 17 "by weight." should read --by volume.--.

Column 29 Line 25 "EXAMPLES 5" should read --EXAMPLE 5--.

Column 30 Line 64 after "tape slipped." insert new paragraph for "(d)".

Column 33 Lines 64-65 after "adhesive sheet" insert --were measured--.

Column 37 Line 46 "EXAMPLE 15-19" should read --EXAMPLES 15-19--.

Column 40 Line 4 between "molecular" and "weights" delete hyphen.

Column 40 Line 23 "Example 23-25" should read --Examples 23-25--.

Column 42 Table 6-continued, column heading "TETRADE" should read --TETRAD--.

Column 42 Table 6-continued, column heading "Shirasu baloon" should read --Shirasu balloon--.

UNITED STATES PATENT AND TRADEMARK OFFICE
CERTIFICATE OF CORRECTION

PATENT NO. : 5,753,362
DATED : May 19, 1998
INVENTOR(S) : Susumu Kawase et al.

It is certified that error appears in the above-identified patent and that said Letters Patent is hereby corrected as shown below:

Claim 10 Column 44 Line 32 after "in claim 1" insert comma --,--.

Signed and Sealed this

Seventeenth Day of November, 1998

*Attest:*

BRUCE LEHMAN

*Attesting Officer*   *Commissioner of Patents and Trademarks*